United States Patent [19]

Lundstrom

[11] 4,054,975

[45] Oct. 25, 1977

[54] TURRET LATHE APPARATUS

[76] Inventor: Carl William Lundstrom, 48 Larchmont Road, Binghamton, N.Y. 13903

[21] Appl. No.: 555,856

[22] Filed: Mar. 6, 1975

[51] Int. Cl.² .......................... B23B 3/18; B23B 39/20
[52] U.S. Cl. ..................................... 29/27 C; 29/36; 29/40; 408/35
[58] Field of Search .................... 29/27 C, 39, 40, 42, 29/26 A; 408/35; 90/87

[56] References Cited

U.S. PATENT DOCUMENTS

| 2,682,698 | 7/1954 | Berthiez | 408/35 X |
| 2,686,995 | 8/1954 | Paredes | 29/40 X |
| 2,953,046 | 9/1960 | Jones | 408/35 X |
| 3,813,745 | 6/1974 | Kuck et al. | 29/36 |
| 3,845,532 | 11/1974 | Smith | 408/35 X |

Primary Examiner—Othell M. Simpson
Assistant Examiner—Z. R. Bilinsky
Attorney, Agent, or Firm—Richard G. Stephens

[57] ABSTRACT

Tools on a lathe having an automatically indexable and translatable turret are powered and controlled by automatically driving the turret to one or more predetermined positions to automatically couple or uncouple one or more detachable power coupling devices which connect power and/or control signals to turret-carried tools while the turret is translated to perform machining operations. Means are shown for effecting flexible mechanical, hydraulic, electrical and/or pneumatic power and control signals to turret-carried devices.

40 Claims, 36 Drawing Figures

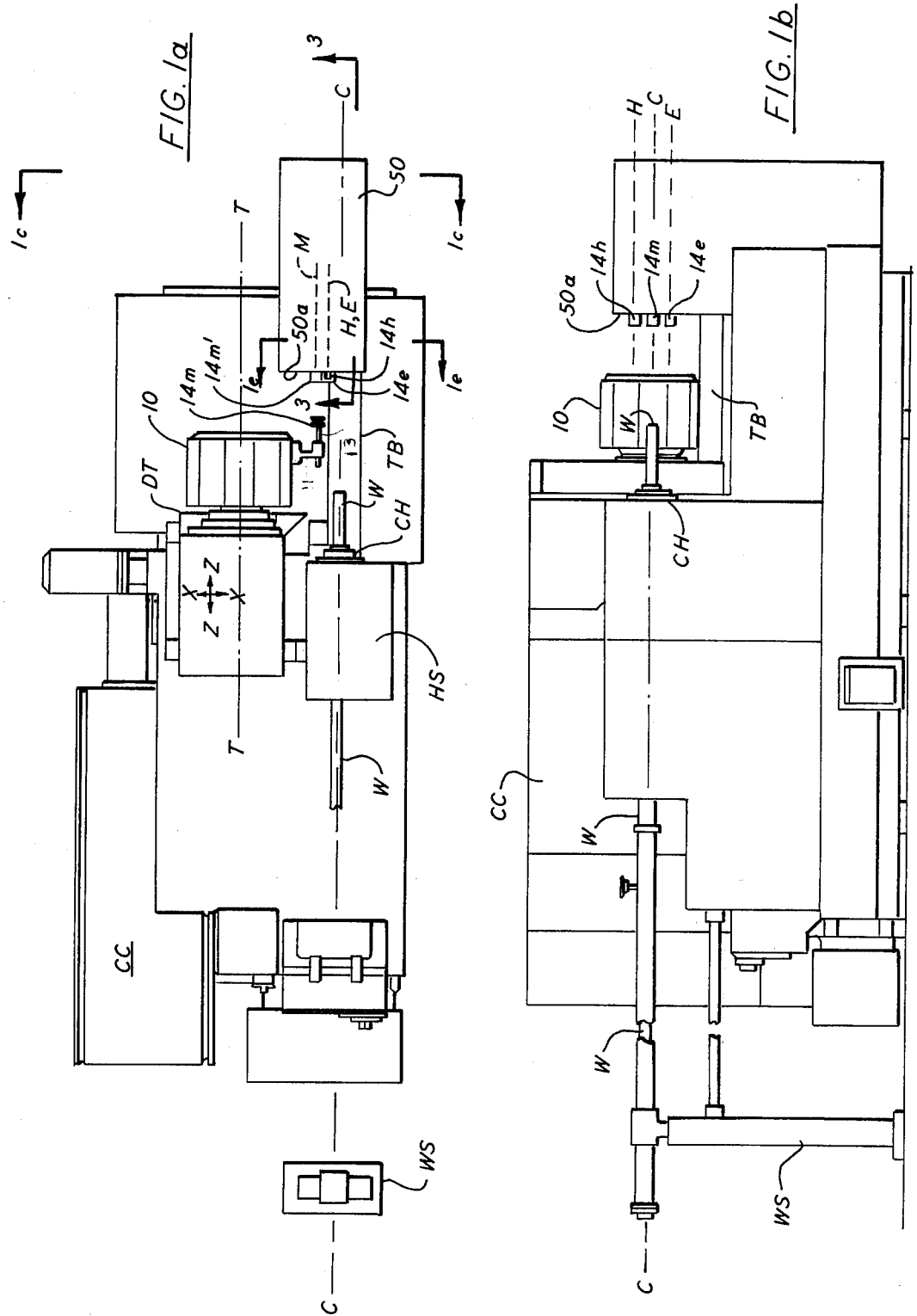

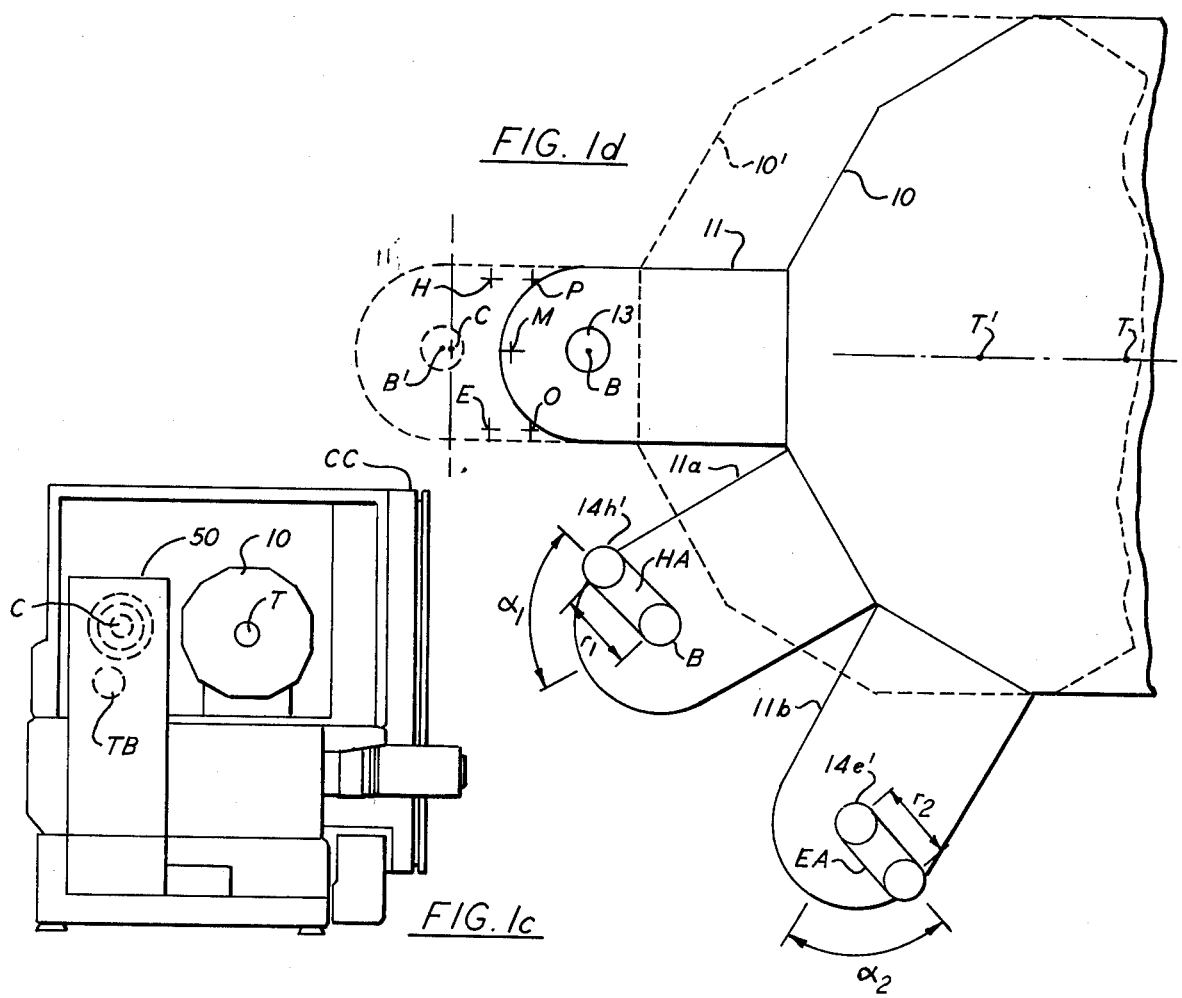
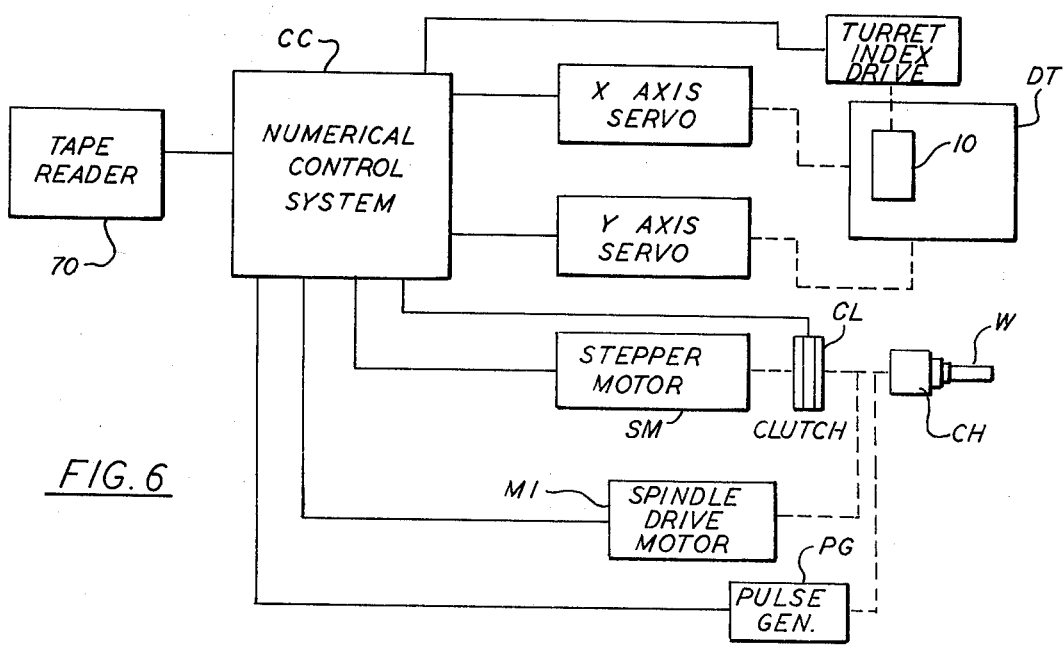

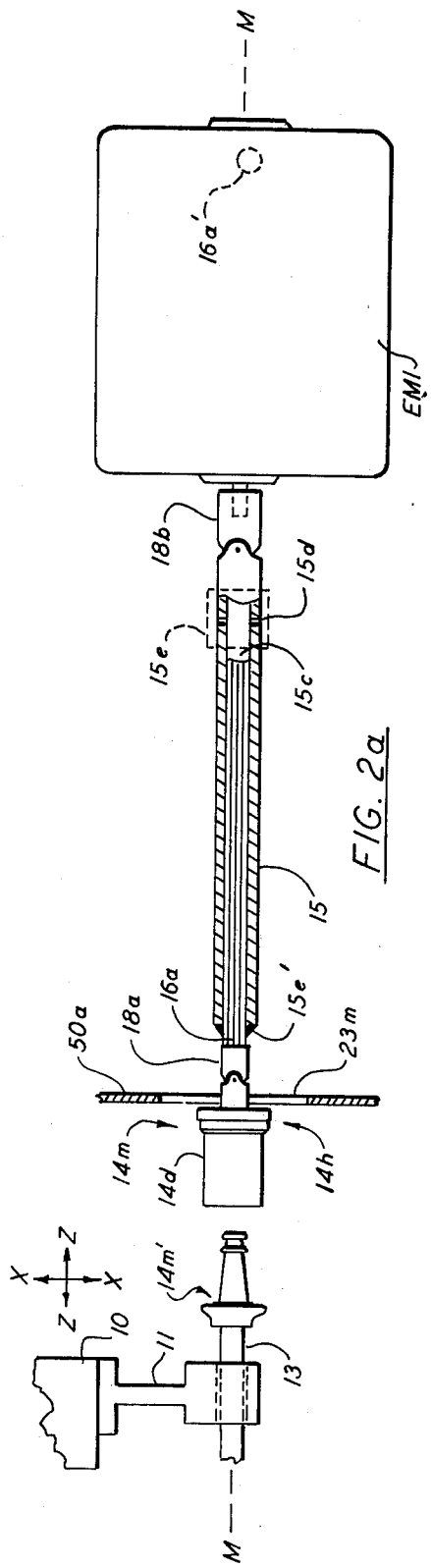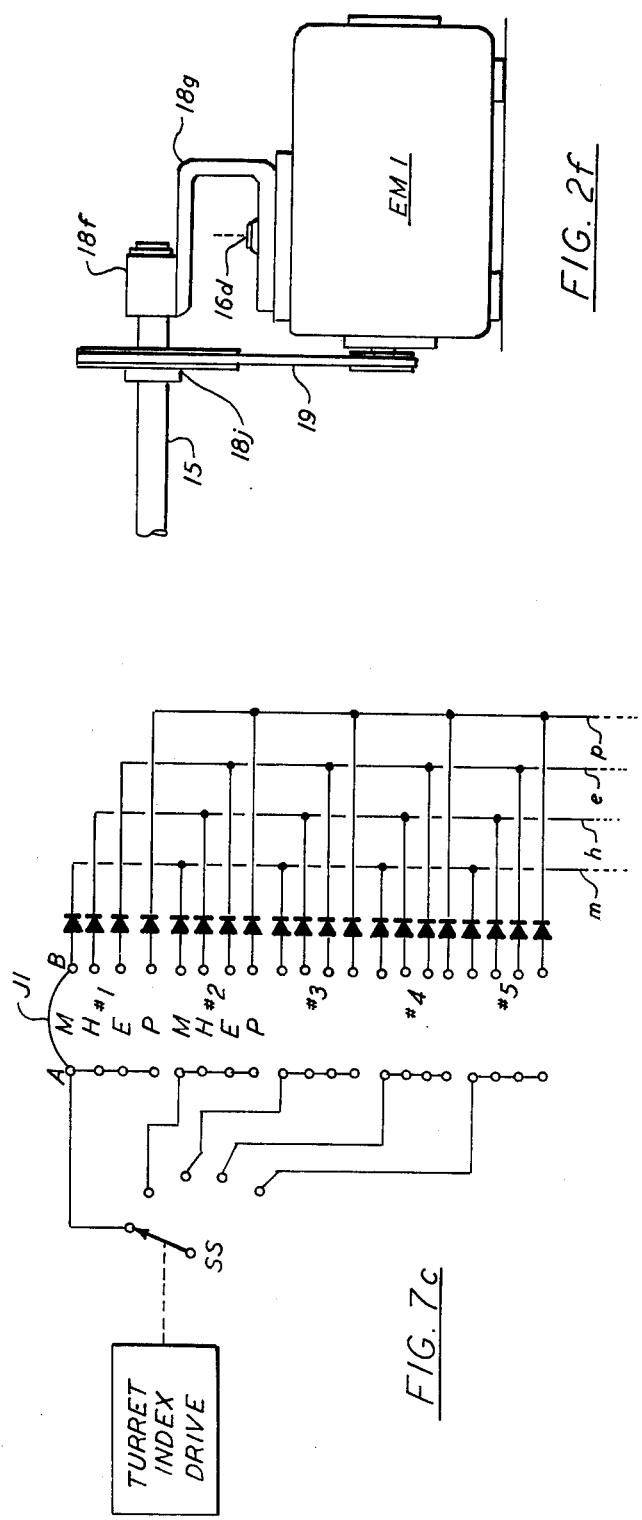

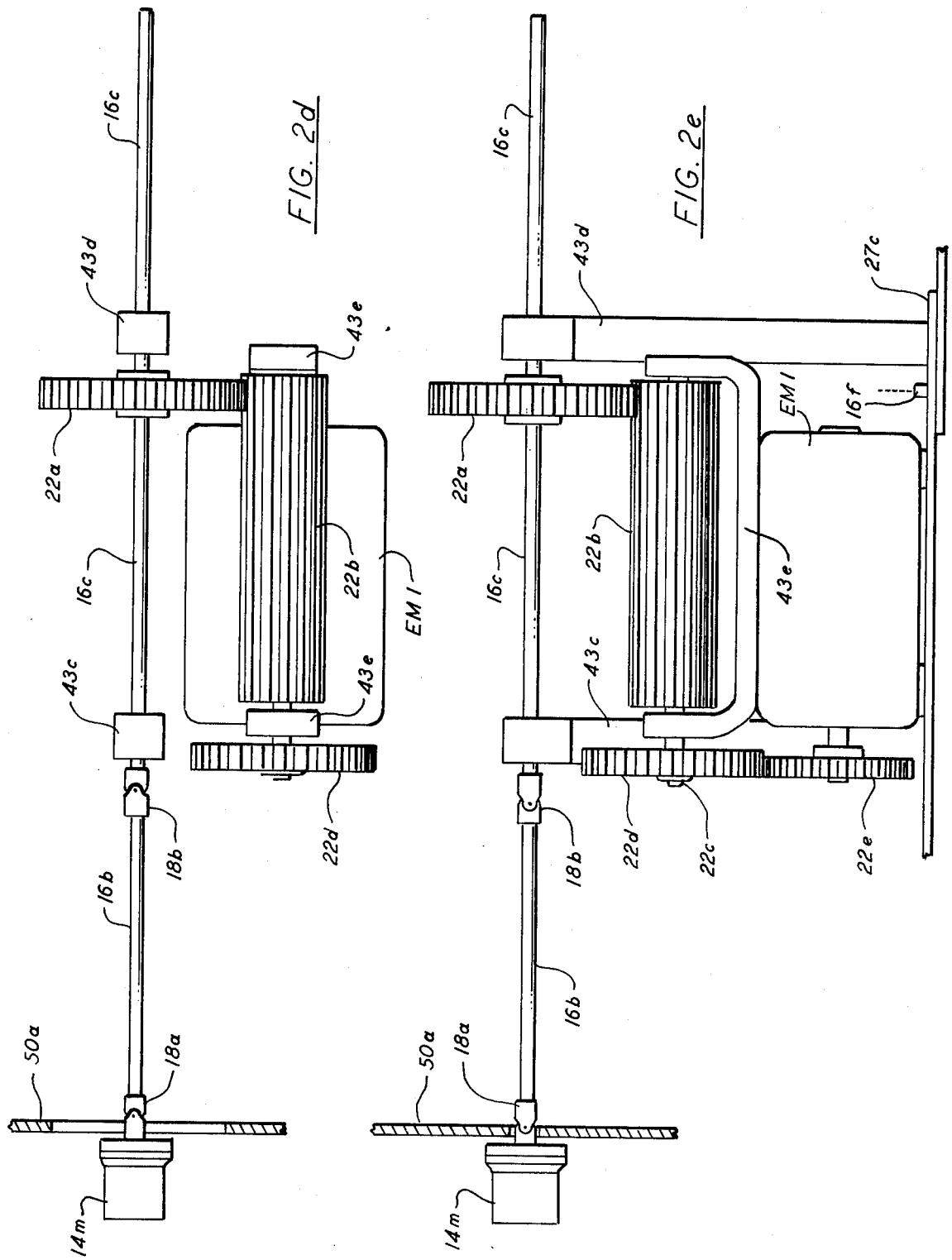

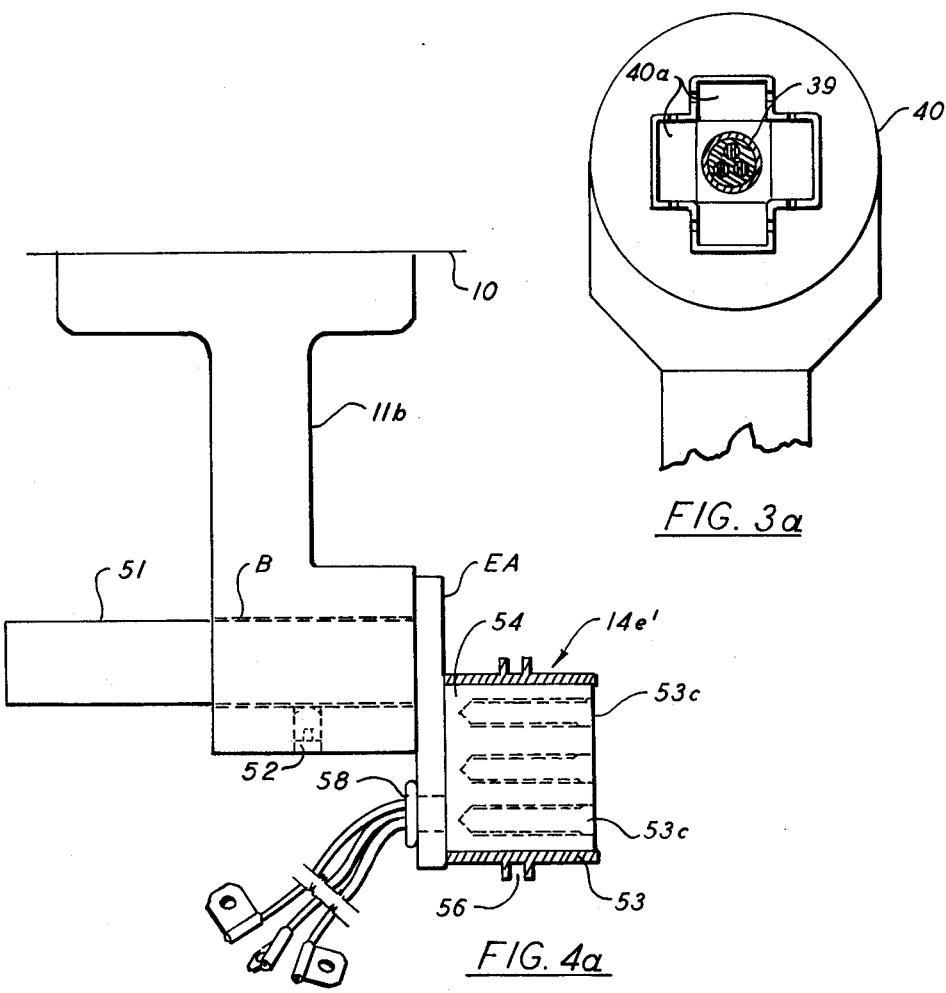
FIG. 3a
FIG. 4a
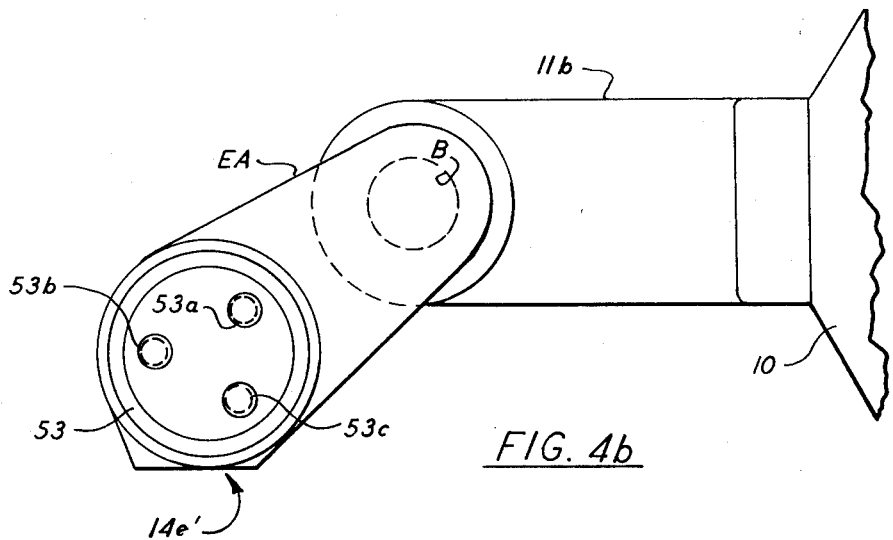
FIG. 4b

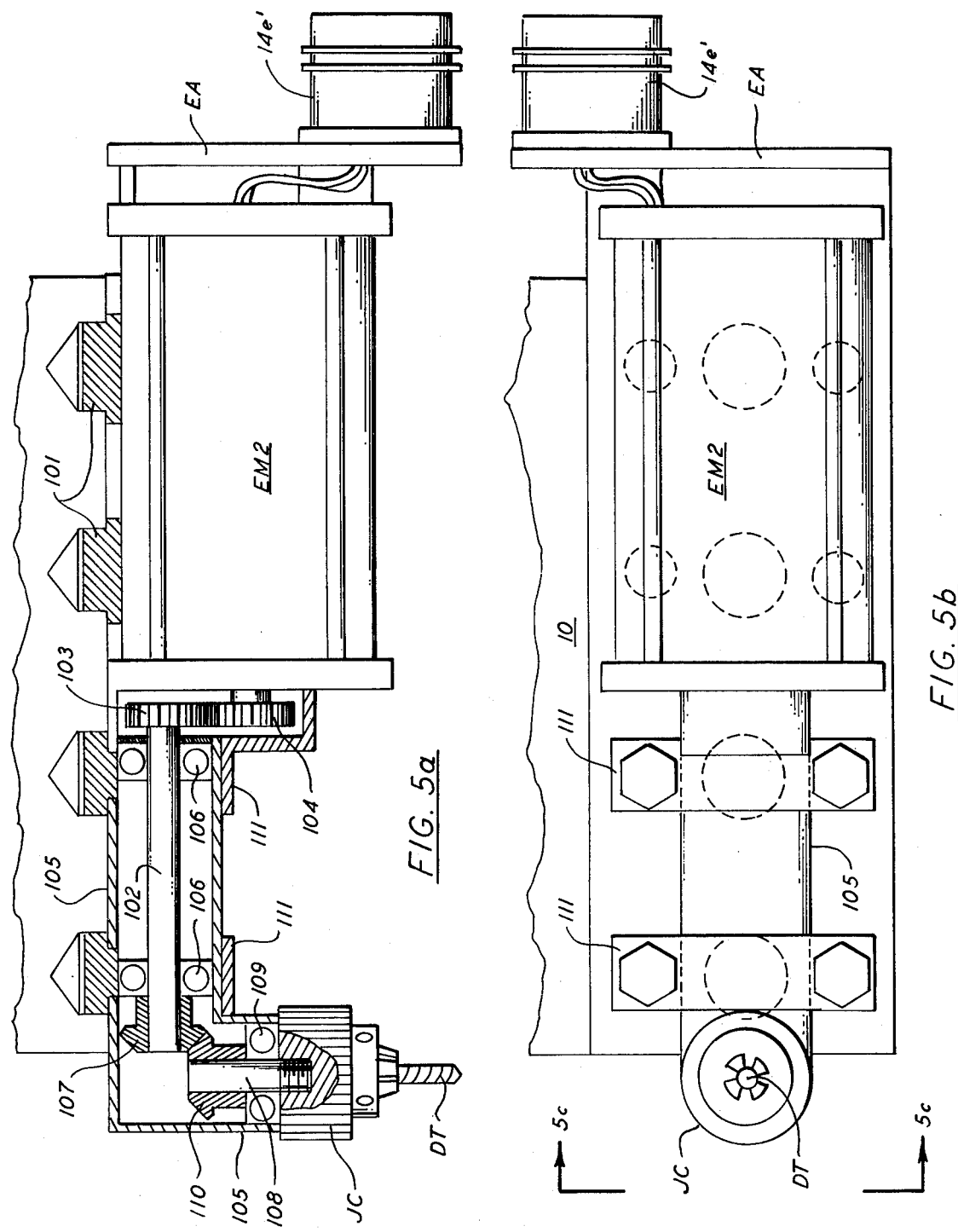

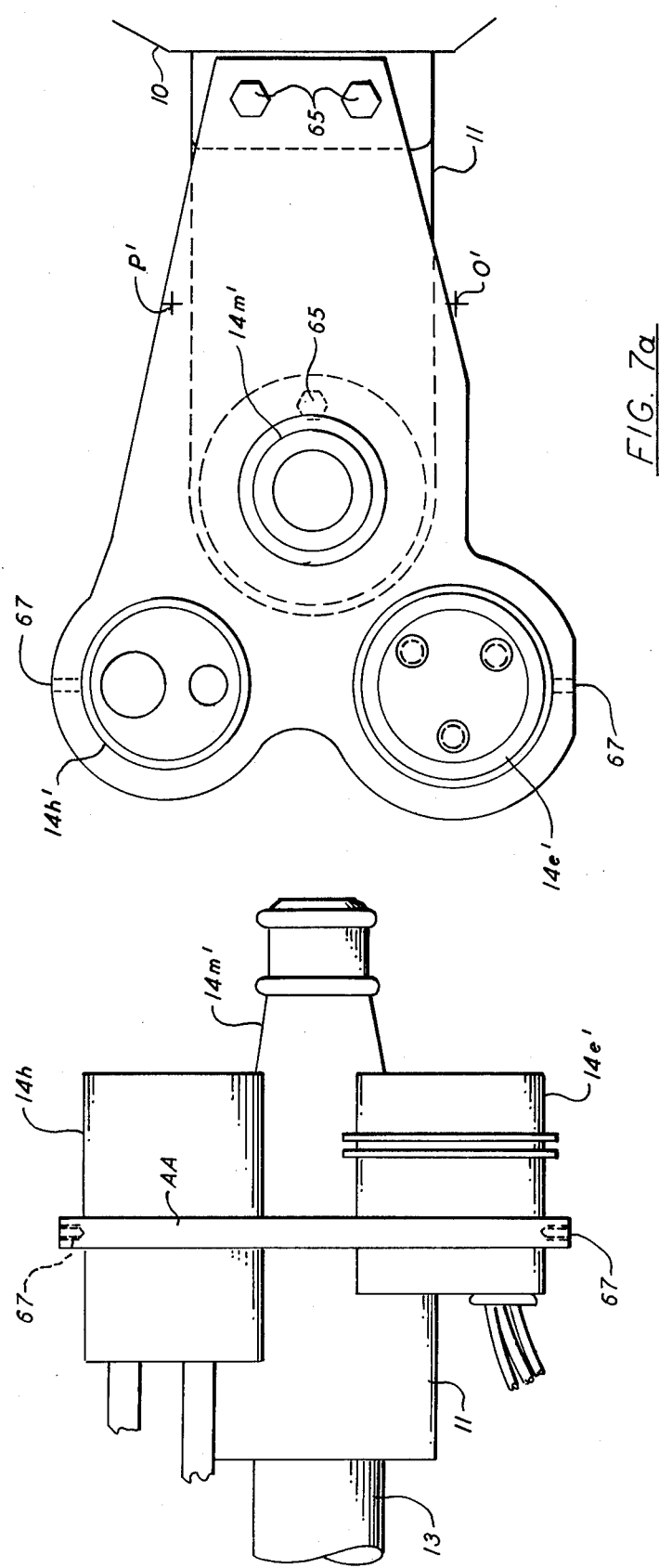

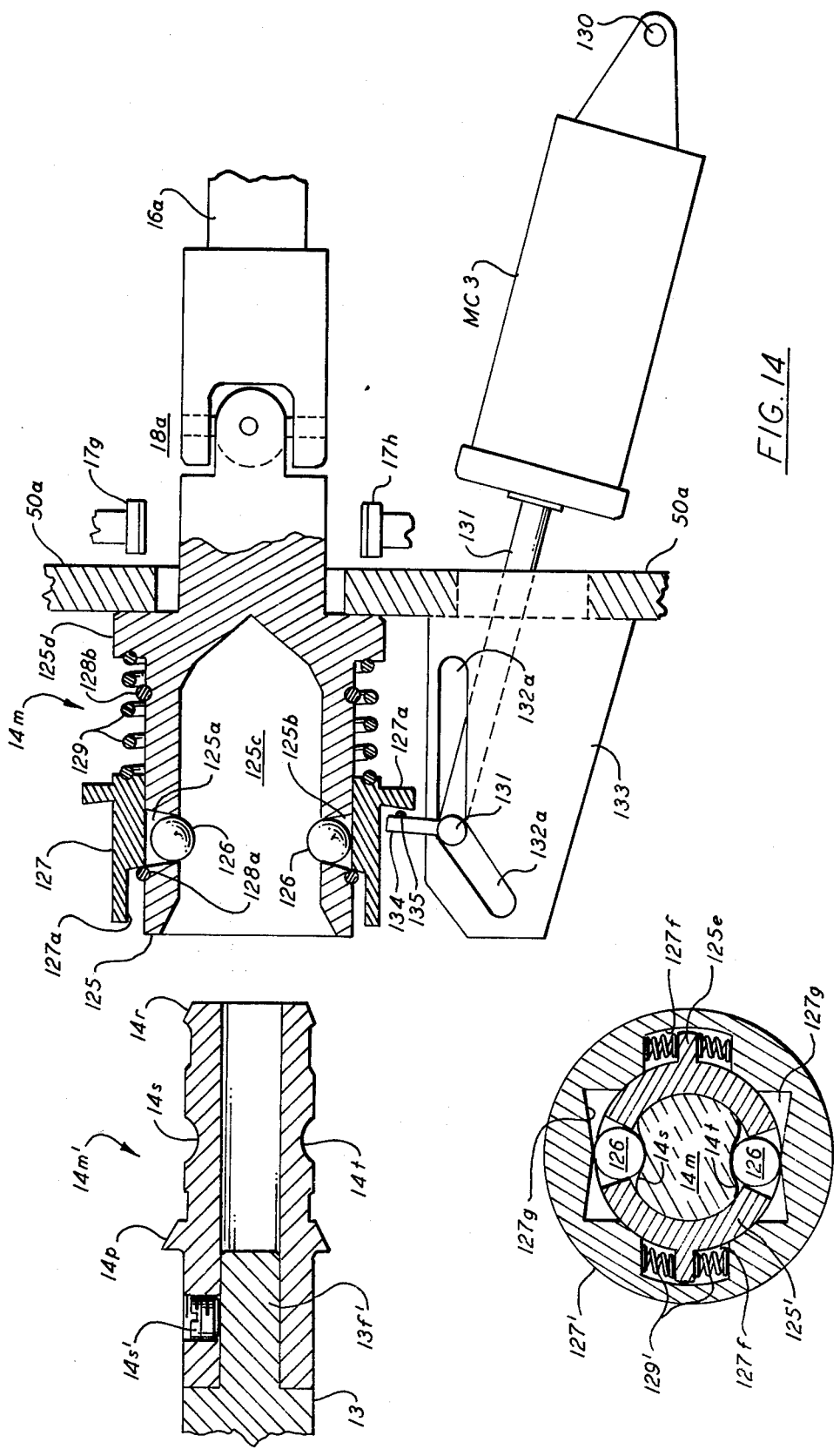

TURRET LATHE APPARATUS

This invention relates to turrent lathes, and more particularly to a turret lathe apparatus incorporating improved means for supplying operating power to a multiplicity of tools carried in a rotatable turrent. The manufacture of many machine parts requires that a variety of successive operations, such as drilling, milling, grinding, shaping, etc., be performed in succession on a workpiece, preferably using automatic or numerical control. The performance of some such operations has been difficult or impossible with many known forms of turret lathe, disadvantageouly requiring that a workpiece be transferred to or from a turret lathe for the performance of some operations in a different machine. The additional set-up time necessitated by such a transfer often has materially decreased productivity. Also, the requirement for set-up of a workpiece in two or more successive machines sometimes may result in material waste due to machinist error, and even in the absence of human error, in relaxed tolerances and less precision. One object of the present invention is to provide improved turret lathe apparatus with which a large number of different operations may be performed on a workpiece, and wherein each of the different operations may be readily performed under semi-automatic or fully automatic control.

Prior art machining operations have often required the stocking and use of a wide variety of cutting tools. For example, the milling of a keyway within a bore often has required the use of a milling tool having a diameter conforming to that of the bore and a rotary cutter having a size and disposition consonant with the width and depth of a given keyway, so that different tools had to be used to provide keyways of various depths or in various size bores. Another object of the invention is to provide lathe apparatus which can perform a wider variety of operations with a lesser number of tools, so that many fewer tool sizes and types need be provided.

Most prior turret lathes cannot effectively perform broaching or shaping operations. A further object of the invention is to provide improved lathe apparatus which can perform broaching and shaping operations, and which can use one or a few tools to cut a wider variety to sizes and shapes of holes and surfaces.

Various known turret lathes are adapted to carry bar-puller devices on one of their turrent faces for use in advancing a workpiece stock, thereby decreasing the number of machining tools which may be carried in a turret having a given number of faces. Another object of the invention is to provide improved turret lathe apparatus incorporating a bar-puller device which may also incorporate a machining tool.

When prior art lathes have performed a sawing or cut-off operation on a workpiece, the cutoff tool used for such an operation has had to have a disadvantageously great width, which has resulted in an expensive waste of stock. Another object of the invention is to provide improved lathe apparatus in which a rotating workpiece may be cutoff utilizing a rotating cutoff tool, which may have substantially less width, thereby resulting in a smaller saw kerf and a resulting savings in material. An additional object of the invention is to provide improved lathe apparatus which may utilize various powered abrasive tools, such as rotary grinding wheels. While many prior lathes have accomplished grinding by use of tool-post grinders, the present invention overcomes the time-consuming setup procedure required for use of a conventional tool-post grinder.

Many prior devices have been unable to provide a sufficient variety of machining operations because some desired operations require vastly different tool speeds or torques than other desired operations. A further object of the invention is to provide improve lathe apparatus in which the differing speeds and torques needed for a very wide variety of operations may be readily provided. Many operations to be performed on a rotating workpiece require or advantageously use rotary or moving tools, while others may better use stationary tools, and a further object of the invention is to provide improved lathe apparatus in which a given tool mounted in a turret may be used selectively in either a rotating or a stationary manner.

Various systems for selectively coupling power to individual tools carried in a turret are known. See U.S. Pat. No. 3,845,532, for example, wherein power from a motor carried with a turret on a two-coordinate table may be coupled to any of the tools carried on the turret. While provision of motive means carried on a turret is quite satisfactory for some machining operations, the requirement that the tool drive means be carried with the turret on the movable table has various disadvantages for certain types of operations. It is difficult to carry large motors of substantial horsepower on some turret tables. The system of the mentioned patent also requires a very special form of turret, making the provision of driving power to the turret tools of an existing turret lathe quite expensive. Another object of the present invention is to provide improved turret lathe apparatus for powering turret-carried tools which is readily adaptable to many existing turret lathes without requiring extensive changes in their existing structures. Furthermore, the wide variety of turret tools to which it is desirable that power be coupled desirably would be operable at widely varying torques and speeds, with much greater variation than that easily available from a single table-carried motor. One important object of the present invention is to provide an improved turret lathe wherein individual tools carried on a turret may be driven from a plurality of diverse power sources. A further object of the invention is to provide an improved turret lathe in which various turret-carried tools may be reciprocated, while others may be rotated.

It is well known that production speed and accuracy may be markedly increased, and tooling costs markedly decreased, by the use of servo-positioning of a tool and a workpiece, using servomechanisms controlled by numerical control system with desired machining operations indicated by coding on a punched tape, for example, or by the use of other forms of automatic control, such as sets of programmable cam-operated switches. Ancillary to each of the previously-recited objects is the further object of providing improved lathe apparatus which is readily susceptible to automatic or numerical control.

Other objects of the invention will in part be obvious and will in part appear hereinafter.

The invention accordingly comprises the features of construction, combination of elements, and arrangement of parts, which will be exemplified in the constructions hereinafter set forth, and the scope of the invention will be indicated in the claims.

For a fuller understanding of the nature and objects of the invention reference should be had to the following detailed description taken in connection with the accompanying drawings, in which:

FIGS. 1a, 1b and 1c are semi-diagrammatic plan, side elevation and end views of one form of turret lathe incorporating the invention, FIG. 1c being taken at lines 1c—1c in FIG. 1a.

FIG. 1d is a diagrammatic view taken in the same direction as FIG. 1c showing certain disclosed spatial relationships on a larger scale.

FIG. 1e is a view taken at lines 1e—1e in FIG. 1a.

FIG. 2a is a view taken at lines 2a—2a in FIG. 1e, with various portions omitted for sake of clarity.

FIGS. 2b and 2c are plan and elevation views of a modified assembly which may be used in lieu of or in addition to the apparatus shown in FIG. 2a.

FIGS. 2d and 2e are plan and elevation views of a further modified mechanical coupling assembly which may be used in lieu of or in addition to the apparatus shown in FIGS. 2a—2c.

FIG. 2f is a side elevation view illustrating a possible modification of a portion of the apparatus of FIG. 2a.

FIG. 3 is a view taken at lines 3—3 in FIG. 1a.

FIG. 3a is an end view of a cable guide shown in FIG. 3.

FIGS. 4a and 4b are section elevation and end views illustrating one manner in which one detachable electrical coupling device may be carried on the turret of the turret lathe shown in FIGS. 1a—1c.

FIGS. 5a, 5b and 5c are plan, side and end views illustrating one manner in which a powered tool may be carried on a turret in accordance with the invention, with various parts in FIG. 5a shown in cross section.

FIG. 6 is a block diagram illustrating control apparatus which may be used with the present invention.

FIGS. 7a and 7b are end side views illustrating the mounting of plural detachable power-coupling devices in the turret for simultaneous transmission of plural types of power to tools carried on a given turret face.

FIG. 7c illustrates a simple electrical control circuit which may be used with an embodiment of the invention which uses the plural coupling concept of FIGS. 7a and 7b.

FIG. 14 is a side view, with certain parts shown in cross-section, of an alternative form of detachable mechanical power coupling assembly which may be used with the present invention.

FIG. 14a is a cross-section view of a mechanical coupling device which may be used with the present invention.

Figure 1E:
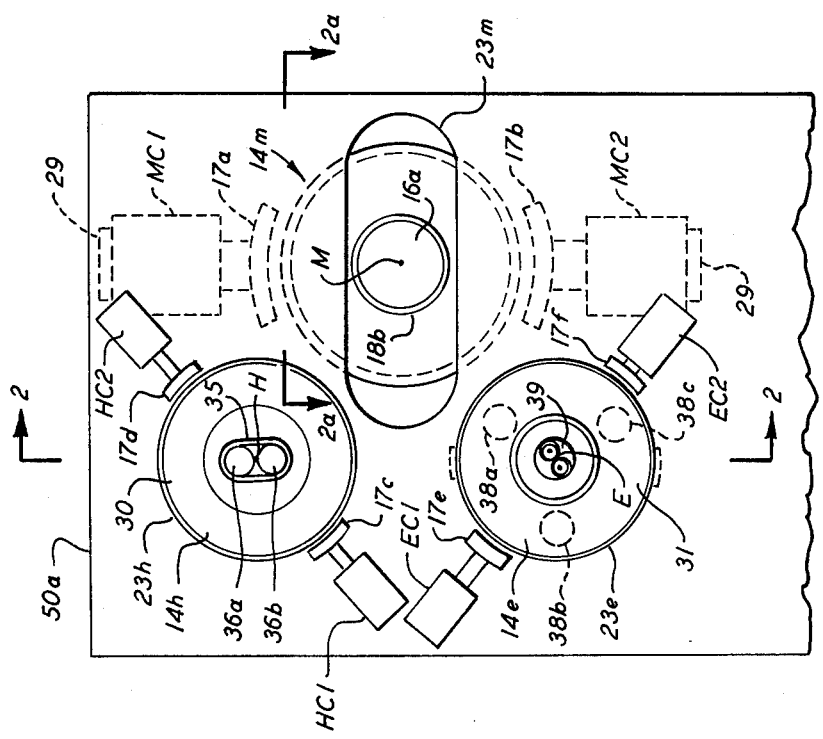

General principles of one form of the present invention subsequently shown in greater detail may be understood by reference to the simplified diagrams of FIGS. 1a to 1c. a known form of turret lathe (such as the Model 1-SC sold by Warner & Swasey Corporation of Cleveland, Ohio) includes a headstock assembly HS having a powered main or headstock spindle carrying a chuck or collet CH which grips and rotates an elongated workpiece W, such as a piece of bar stock, about a main spindle axis labelled C. The outer end of workpiece W is shown supported by a conventional support WS. Means (not shown) are provided to retract the chuck jaws from the workpiece so that other means to be described may advance the workpiece along the C axis. The rotation of the chuck and workpiece about the main spindle axis is sensed by a known form of shaft rotation encoder. A multi-faced turrent 10 is mounted for rotation about an axis T which extends parallel to axis C at the same vertical level as axis C. The direction in which axes C and T extend is termed the Z direction, and movement away from the headstock will be termed the positive Z direction. Turret 10 may be provided with twelve faces, for example, on any of which one or more tools may be fixedly bolted in a respective toolholder, and by indexing turret 10 about axis T in one or more increments of 30 degrees, any of the tools may be presented to the workpiece. A turret face or a tool carried thereon will be said to be in "working position" when it has been indexed to face the workpiece W. Turret 10 is carried on a multi-coordinate servo-controlled drive table DT, so that turrert 10 may be advanced toward or retracted away from workpiece W in a direction perpendicular to the Z direction which is indicated as X in FIG. 1a, and so that turret 10 may be translated along the length of the workpiece, in the Z direction. In a typical arrangement, using the mentioned commercially-available machine, the total motion of turret 10 in the cross-feed or X direction may be of the order of 4 inches, and the total motion in the Z direction about 8 inches. With such an arrangement, a substantial variety of machining operations may be rapidly and accurately performed, but such an arrangement has a variety of limitations which the present invention is intended to overcome.

In accordance with the present invention one or more of the tools carried on turret 10 are powered or driven tools rather than being unpowered or stationary tools, and means are provided for selectively applying power to various ones of the tools or to various groups of the tools as they are indexed to an operating position facing the workpiece W. As will become clear below, various forms of the invention may apply mechanical, electrical, hydraulic or pneumatic power to tools carried on the turret. A plurality of tool-holders 11 of known type may be bolted to respective faces of turret 10. Each tool-holder 11 is provided with a through bore. As will be shown in detail, various forms of rotatable tools may be mounted in the bore of the tool holders or otherwise mounted on the various turrert faces at predetermined positions relative to the turret faces. In some embodiments of the invention, the holders mounted on the turret faces may include means for carrying and energizing electrical drive means, such as electrical motors, and/or hydraulic drive means, such as hydraulic rotary or reciprocating motive means. Each tool desired to be mechanically driven by a rotating input shaft is provided with a spindle 13 (FIG. 1a) which extends rightwardly a short distance from its respective tool holder and carries an adapter 14m'. If a given tool on the turret includes an electrical or hydraulic motor carried therewith on the turret, one-half of an electrical coupling device 14e' or a hydraulic coupling device 14h' will extend from the turret in lieu of a spindle end 13. In accordance with one feature of one form of the present invention, a tool-powering assembly 50 is mounted a predetermined distance from the chuck CH, in roughly the position where a tailstock is sometimes mounted on such lathes for between-centers operations. The tool-powering assembly 50 may, if desired, be mounted on the machine in the same manner as a conventional tailstock, and securely fastened so that it will not move in the Z direction. The mentioned commercially-available lathe includes a bar TB on which a tailstock may be mounted, and tool-powering assembly 50 is shown mounted on bar TB. Assembly 50 includes a mounting plate or face 50a facing the headstock upon which a plurality of different types of power coupling devices are removably seated. The Z position of the tool-powering assembly mounting plate 50a preferably is adjacent the point of maximum travel of the turret 10 in the Z direction. Power is supplied to a given turret-carried tool by indexing turret 10 to a given index position about axis T, translating turret 10 in the X direction so that the spindle, electrical coupling or hydraulic coupling associated with the given turret-carried tool is positioned on a given axis, such as one of those shown at M, H and E, and then translating turret 10 in the positive Z direction (away from the headstock) so that the spindle or coupling is automatically gripped by a coupling device removably positioned on plate 50a of tool-powering assembly 50. The maximum rightward (in FIG. 1a) position of turret 10 at which a spindle or coupling part carried on the turret engages a mating coupling part seated on tool-powering assembly 50 will be termed the Z "home position." Coupling devices 14m, 14e and 14h are shown seated on assembly 50, with device 14h situated directly above device 14e, and with devices 14h and 14e spaced apart from device 14m in the X direction. Coupling device 14m shown seated on the axis designated M comprises a mechanical coupling device adapted to engage the spindle-carried adapters 14m of one or more turret-carried tools, coupling device 14e shown seated on an axis designated E comprises an electrical coupling device adapted to engage one or more electrical plugs or receptacles 14e' carried on turrent 10, and coupling device 14h shown seated on axis H comprises a hydraulic coupling device adapted to engage one or more hydraulic coupling devices 14h' carried on turret 10. Thus connection of a given spindle 13 and its adapter to coupling device 14m requires that turret 10 be indexed, and translated in the X direction, to position that spindle 13 on the M axis, and that turret 10 then be driven to the Z home position. Similarly, connection of power to a given electrical or hydraulic coupling on the turret requires that the turrent be indexed, and translated in the X direction to position the given turret-carried coupling on the E or H axis, respectively, and then driven to the Z home position. If the specific device shown in FIGS. 1a–1d, the relative lateral (X) and vertical spacing of the M, H and E axes are advantageously related to the manner in which coupling devices 14m', 14h' and 14e' are mounted on the turret, so that a single X position of the turret (shown as the X mid-position) will locate a turret-carried mechanical coupling device 14m' on the M axis when the turret face carrying that coupling device is indexed into the working position, or will locate a turret-carried hydraulic coupling device 14h' on the H axis when the turret face carrying that coupling device is indexed into working position, or will locate a turret-carried electrical coupling device 14e' on the E axis when the turret face carrying that coupling device is indexed into working position. As will be seen below, driving the turret in the Z direction with the turret at its X mid-position will cause a given coupling device 14m', 14h' or 14e ∝ on the turret to be automatically engaged with or snapped on to a coupling 14m, 14h or 14e which is then removably seated on assembly 50. Since the turret can be automatically indexed and driven very rapidly and fully automatically along a specified X coordinate (such as the X mid-position) to the Z home position, automatic connection of power to a given turret tool can be accomplished very rapidly and fully automatically. While the arrangement presently being described advantageously uses a single X position of the turret for coupling and uncoupling any of the different types of power sources, it will become clear as the description proceeds that the feature is not an absolute requirement of the invention.

After mechanical, electrical or hydraulic power is connected to a given turret tool by translation of turret 10 to its home position with coupling device 14m', 14h', or 14e' aligned along axis M, E or H, respectively, the turret is then driven in the negative Z direction, i.e. toward the headstock, to withdraw the then-engaged coupling device 14m, 14e or 14h from its seated or home position on assembly 50, and then, with the given turret-carried tool powered, the turret is driven in the X and Z directions in the manner required to perform a desired machining operation on the workpiece W. After the desired machining operation has been completed, the coupling 14m, 14e or 14h then connected to a turret tool is disconnected from the turret tool and replaced in its seat or home position at assembly 50 so that it may later be re-connected for further use, either to drive a different turret-carried tool or the same turret-carried tool. A coupling device 14m, 14e or 14h is replaced in its home position on assembly 50 by driving the turret to its Z home position with the pair of previously-engaged coupling devices aligned along the M, E or H axis on which they were previously brought into engagement. Then, the turret-carried spindle or coupling which has been powered is disconnected by driving the turret in the negative Z direction, i.e. toward the headstock, while simultaneously preventing release of the engaged coupling 14m, 14e or 14h from its seat or home position on assembly 50.

While FIG. 1a illustrates the use of three mutually-differing types of power-couplings at 14m, 14e and 14h for selective use of mechanical, electrical or hydraulic power coupling, it is important to note that two or more power couplings of the same generic type can instead be provided. For example, a second mechanical coupling device (not shown) similar to coupling device 14m could be provided in lieu of coupling device 14e or 14h, with coupling device 14m being driven by a low-torque high-speed motor and the other mechanical coupling device being driven by a high-speed low-torque motor. Such an arrangement will be seen to allow a given turret-carried tool to be selectively powered by any one of two (or even more, if desired) separate power sources. If desired, a mating pair of pneumatic coupling devices (not shown) may be provided on the turret 10 and assembly 50 in lieu of or in addition to the devices shown. Also, in some embodiments of the invention, only a single type of coupling device will be carried on tool-powering assembly 50.

With any of coupling devices 14m, 14e or 14h connected to power a turret-carried tool, withdrawal of the coupling device from its home position, and subsequent motion of the turret, in the X and Z directions to perform a machining operation on the workpiece, will be seen to require a flexible power connection between the engaged coupling device and its home station as assembly 50. The use of flexible electrical cable or hydraulic hose readily allows coupling devices 14e and 14h to move as necessary relative to their home positions, and a variety of different cable or hose retracting reels or other devices may be readily used to pay out or reel in cable or hose in a desired manner. Several exemplary forms of flexible mechanical assemblies which may be used to allow X and Z motion of mechanical coupling device 14m will also be illustrated.

A central concept of the present invention contemplates that each coupling device 14, no matter what its type, always be returned to a known position, i.e. one having known X, Y and Z coordinates, when it is disconnected from the turret, so that it thereafter may be automatically engaged by merely driving the turret, under program control, to a predetermined position. The use of freely flexible power-connecting means would tend to suggest that a coupling device 14 once withdrawn from its home position or assembly might thereafter have an unknown or indeterminate position once it was released from engagement with the turret. However, the invention contemplates that a coupling device be returned after being used to the same home position from which it was previously extracted, and that once returned to its home position, be maintained aligned and fixed in a predetermined position by suitable clamping or holding means, so that it may later be automatically reconnected for another machining operation.

It is not absolutely necessary that each of the different types of coupling 14 be engaged and disengaged by turret translation to the same Z coordinate, i.e., slightly differing Z limit positions could be used for different types of couplings, but the use of the same Z home position for all of the couplings is generally preferred for sake of programming and circuit simplicity. It is not necessary that the M, E and H axes correspond to selected positions of turret-carried couplings when the turret has been indexed so that their associated tools face the workpiece. For example, the M, E and H axes could instead lie in the positions of couplings arranged to drive tools not then indexed to face the workpiece. With such an arrangement, a turret-carried tool would be indexed to face the workpiece after having been connected to a coupling 14m, 14e or 14h. Such an alternative arrangement has no apparent advantage, however, and it does tend to require that more flexibility be provided in the power-coupling between the turret and assembly 50 to accommodate turret indexing while a coupling 14 is engaged. While sufficient flexibility can be provided in electrical cables and hydraulic hoses, a requirement for increased flexibility becomes rather disadvantageous in the case of mechanical coupling. Hence the system illustrated, in which turret indexing is not required while power is being supplied to a turret tool, is preferred. A modified arrangement, wherein turret indexing need not occur when a mechanical coupling is engaged but wherein turret indexing may occur with an electrical and/or hydraulic coupling engaged, is however, quite workable. The system illustrated, wherein no turret indexing occurs while a coupling is engaged is also preferred from the standpoint of programming simplicity by reason of uniformity. In FIG. 1d, axis M is shown situated in the X direction at the position at which a spindle 13 carried on the turret lies when the turret is at the mid-position of its X direction range of travel, while axes H and E are laterally displaced therefrom. While that arrangement is not absolutely necessary, it is deemed advantageous, because it tends to result in a requirement for least flexing in a mechanical power coupling, allowing somewhat more flexing in a hydraulic or electrical power coupling arrangement, which may use a flexible hose or cable having substantially flexibility.

In the end view diagram of FIG. 1d the main spindle and workpiece axis is shown at the left at C. Turret 10 which is shown partially, is shown in solid lines at its maximum retracted distance in the X direction from axis C, and shown in dashed lines at its opposite travel limit in the X direction. The turret indexing axis is shown at T and T' for the two respective X direction limit positions of the turret. A tool holder 11 is shown carried on the face of the turret shown in working position, the tool holder being shown provided with a bore B. The positions of the tool holder 11 and bore B when the turret is at its inward limit position in the X direction are shown in dashed lines at 11' and B', respectively. The M axis is shown located midway between the two limit positions of the tool-holder 11 bore B. While such a location of the M axis is not mandatory, it is deemed preferable because it minimizes the amount of flexing required in a flexible mechanical shaft which from time to time connects mechanical power from power coupling assembly 50 to a spindle 13 in a tool-holder such as 11, and in any further tool-holders (not shown) which are carried on turret 10 in the manner of holder 11 on other faces of the turret.

In FIG. 1d a second tool-holder 11a shown mounted on the turret is provided with a similar bore B. Rather than carrying a rotatable spindle, bore B of tool-holder 11a carries a non-rotatable shaft, from which arm HA extends a predetermind radial distance $r_1$ at a pedetermined angle $a_1$ to support a hydraulic coupling device 14h. When turret 10 is indexed to bring the turret face carrying tool-holder 11a into working position and translated in the X direction to its mid-position, the center of coupling device 14h' then will be seen to lie on the H axis shown in FIG. 1d. A third tool-holder 11b carries an arm EA which extends a predetermined radial distance $r_2$ at an angle $a_2$ to support electrical coupling device 14e'. When turret 10 is indexed to bring the turret face carrying tool-holder 11b into working position and translated to its mid-position in the X direction, the center of electrical coupling device 14e' then will be seen to lie on the axis shown at E in FIG. 1d. Because arms HA and EA support coupling devices 14h' and 14e' at positions which are displaced from the bores of tool-holders 11a and 11b in the same manner that axes H and E are displaced from axis M, it will be seen that either a mechanical, a hydraulic or an electrical coupling may be aligned with one of axes M, H and E by translation of the turret to its mid-position in the X direction.

In FIG. 1d the angles $a_1$ and $a_2$ are shown equal and the radial distances $r_1$ and $r_2$ are shown equal, but that is by no means necessary. Also, while axes H and E are shown above and below the M axis location, that is not an absolute necessity. The M axis is preferably located at the same vertical level as the main spindle axis C to minimize the required shaft flexing. It will be seen that the radially extending arms serve to space the H and E axes from the M axis even if tool-holders, 11, 11a and 11b are identical to each other. It will be apparent that the arms are unnecessary if different forms of tool-holders are used for the different forms of power-coupling devices. While the H and E axes are shown located inwardly (i.e. toward the C axis) from the M axis, that is by no means a requirement, since one or both such axes may instead be located on the opposite side of the M axis, or above and below the M axis in some embodiments of the invention. In FIG. 1d two further axes are shown at P and O, and it will now be apparent that further types of coupling devices may be carried on turret 10 so that they will be aligned with one or the other of those axes when the turret is suitable indexed and driven to its mid-position in the X direction. Furthermore, it is not necessary that the mid-position in the X direction be utilized as the coupling and uncoupling location for all of the power-coupling devices. While that arrangement is preferred for mechanical power coupling, some departure from precisely the mid-position is certainly possible even for mechanical power coupling, and wide departure from the X mid-position may be used for coupling and uncoupling hydraulic, electrical and pneumatic power coupling devices. Thus it is quite within the scope of the invention to provide mechanical coupling and uncoupling at or near the mid-position in the X direction, and to provide hydraulic, electrical and pneumatic coupling and uncoupling at various other X positions of the turret. Thus the vertical positions and the positions in the X direction for the H, E, P and O axes may vary considerably from the exemplary arrangement shown, with the spacings of these axes being selected mainly so as to provide adequate clearance between the different types of coupling devices. Adequate clearance becomes a problem only if the overall X travel of the turret and the turret radius tend to be small and the sizes of the coupling devices are required to be large.

Figure 2:
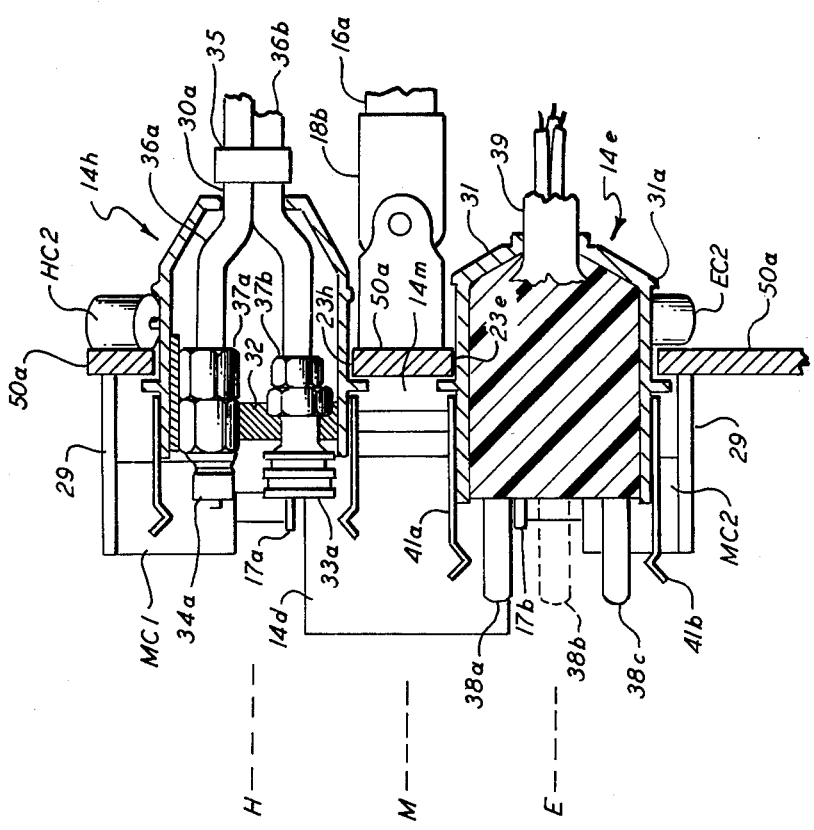
FIG. 2 is a view taken at lines 2—2 in FIG. 1e.

In FIGS. 1e and 2 mounting plate 50a of assembly 50 is shown (on an enlarged scale) with axes M, H and E spaced relative to one another in the same manner as in FIG. 1d, with three power coupling devices 14m, 14h, 14e shown in their home or reference positions. Mechanical coupling device 14m is shown as comprising the holder or body portion of a detachable coupling of the type marketed under the trademark "Roto-change" by the Universal Engineering Division of Houdaille Industries of Frankenmuth, Michigan. The rear end of holder 14m is shown affixed to one half of a conventional Hookes U-joint coupling 18b, the other half of coupling 18b being affixed to a splined shaft 16a, so that rotation of shaft 16a rotates holder 14m. U-joint coupling 18b is shown passing through a slot or aperture 23m in plate 50a. The forward end of holder 14m carries a cylindrical release sleeve 14d. A pair of linear actuators MC1, MC2 carried on the outer side of plate 50a on brackets 29, 29 carry arcuate brake shoes 17a, 17b. Operation of the actuators to extend the shoes causes the shoes to frictionally engage the release sleeve of the holder 14m, thereby centering shaft 16a and holder 14m on the M axis.

Hydraulic coupling device 14h is shown as comprising a generally cylindrical outer shell 30 seated within circular aperture 23h in plate 50a. Actuation of linear actuators HC1, HC2 to extend clamp shoes 17c, 17d grips shell 30, preventing hydraulic coupling device 14h from being pulled away from its seated position, i.e. leftwardly in FIG. 2. Electrical coupling device 14e is shown as comprising a generally cylindrical outer shell 31 seated within circular hole 23e in plate 50a. Actuation of actuators EC1, EC2 to extend clamp shoes 17e, 17f grips shell 31, preventing electrical coupling 14e from being pulled leftwardly in FIG. 2. In hydraulic coupling device 14h a spacer casting 32 non-rotatably affixed within sleeve 30 carries a pair of high-pressure two-way shut-off quick-detachable hydraulic coupling halves, a female or socket-type coupling half being indicated at 33a, and a male or plug-type coupling half being indicated at 34a. Socket 33a and plug 34a may comprise, for example, a socket type 70474 and plug type 70476, respectively, commercially available from Boston Gear Works, Quincy, Massachusetts. Supply and return hydraulic hoses 36a, 36b connected to socket 33a and plug 34a by standard hydraulic compression fittings 37a, 37b extend rearwardly through opening 30a of shell 30 and are bound together at intervals along their length by bands such as 35. Electrical connector 14e is shown as comprising a simple three-conductor plug having three male prongs 38a–38c which are connected to the conductors of a three-conductor cable 39, the end of the cable and the prongs preferably all being molded within a solid plastic body which fills shell 31. It may be mentioned at this point that electrical connector 14e' may include a different number of power conductors, and may include a plurality of "control," as distinguished from "power" conductors. The control wires may be used to conduct a wide variety of different control signals to electrically-operated devices carried on the turret, and to transmit signals from turret-carried electrical devices (such as switches, potentiometers, tachometer generators and other types of transducers) to assembly 50. Similarly, the hydraulic coupling device may include a different number of connectors, and some of the connectors may carry hydraulic "pilot" or control signals rather than hydraulic "power." While a pneumatic connector is not per se shown, it will be apparent that detachable air connectors substantially identical to the hydraulic devices mentioned may be provided. For many pneumatic applications the use of a return line is unnecessary, with air exhausted from a turret-carried pneumatic motive means merely being discharged to atmosphere, so that a single pneumatic connector, preferably centrally-mounted within a housing similar to a housing 29, will be preferred.

Electrical, hydraulic or pneumatic control lines which connect to the six linear actuators shown in FIG. 2 are not shown, for sake of clarity. The actuators may comprise electrical solenoids, or pneumatic or hydraulic cylinders.

FIG. 2a illustrates in plan view a preferred manner in which rotary mechanical power is connected to mechanical coupling device 14h to drive a turret-carried spindle 13, and also generally illustrates at 14m' a turret-carried adapter portion of the above-mentioned "Rotochange" coupling assembly. If the holder portion 14m is rotating, adapter 14m' may be driven into the open end of the holder, whereupon the holder will tightly grab and rotate the adapter 14m'. Thus the mere programming of the lathe to drive adapter 14m' along the M axis, together with rotation of holder 14m will cause spindle 13 to be driven, to drive a turret-carried tool (not shown in FIG. 2a). After coupling portions 14m' and 14m are so engaged, turret 10 may be driven in the Z and then X directions, to move the now-powered tool relative to the workpiece in any desired manner. As the turret moves leftwardly with coupling portions 14m and 14m' engaged, holder 14m is moved away from its home position where it is shown in FIG. 2a. Leftward and rightward movement of holder 14m causes splined (or otherwise non-circular) shaft 16a to telescopingly move outwardly from and inwardly into a recess 15c of mating cross-section provided in hollow shaft 15. The rightward end of shaft 15 is shown connected to the output shaft of motor EM1 by means of a second U-joint coupling 18d, in which case motor EM1 may be fixedly attached to the base (not shown) of power assembly 50. Alternatively, U-joint coupling 18d may be eliminated, and shaft 15 connected directly to the motor shaft, if motor EM1 is mounted to slightly pivot about a vertical axis, as that at 16a', for example. As the turret moves in the X direction so as to displace holder 14h on one side or the other of the M axis, coupling 18a flexes slightly, shaft 16a telescopes very slightly, and coupling 18b flexes (or the motor rotates slightly about axis 16a' if coupling 18b is omitted). With the holder 14m drawn leftwardly and then moved in the X direction, a portion of shaft 16a will be seen to move within aperture 23m in plate 50a. The aperture is provided with sufficient width in the X direction so that shaft 16 will not touch an ever the holes to prevent entry of metal particle although this becomes unnecessary if assembly 50 is suitably enclosed. A felt wiper 15e' is shown mounted adjacent the left end of shaft 15 for similar purposes.

FIG. 2f illustrates a further manner of connecting mechanical power from motor EM1 to internally-s, splined shaft 15 which may be used alternatively to use of coupling 18b or pivotal mounting of motor EM1. In FIG. 2f the end of shaft 15 is journalled in bearing 18f carried on bracket 18g, which is shown pivotally mounted about a vertical axis at 16d, so that translation of the turret in the X direction slightly pivots bracket 18g and bearing 18f. Pulley 18j affixed to shaft 15 is driven by belt 19 from motor EM1, which is fixedly mounted relative to the machine base, and thus the flexibility of the belt accommodates a portion of the motion of the shaft 15. Bracket 18g could, of course, be pivotally mounted relative to the machine base on some convenient structure other than motor EM1.

Inasmuch as holder 14m should be rotating during a coupling operation for adapter 14m' to be driven into coupled engagement with the holder, switching means (not shown) in FIG. 2a are provided to start motor EM1 as an adapter such as 14m' is driven toward the holder, and prior to when the adapter touches the holder. A switching signal may be provided to start motor EM1, whenever the turret Z position coordinate exceeds a predetermined amount. As will be explained below, the required switching signal may be derived in any one of a variety of different ways. In order to disengage adapter 14m' from holder 14m, the release sleeve portion of the holder must be rotated very slightly relative to the base portion of the holder attached to shaft 16a while the base portion is rotating. Thus for disengagement, the turret is driven to place holder 14m in its home position on the M axis, cylinders or solenoids MC1 and MC2 (FIGS. 1e and 2) are operated to brake the release sleeve, and while the release sleeve is being braked, the turret is then driven leftwardly, withdrawing the adapter 14m' from the holder 14m. Then motor EM1 is stopped and the brake shoes 17a, 17b are left in engagement with the release sleeve to maintain holder 14m accurately positioned at its home position on the M axis, so that it may later be re-connected with adapter 14m'.

It will now become apparent that hydraulic and electrical connectors 14h' 14e' which mate with connectors 14h and 14e may be readily connected and disconnected in generally the same manner as that described above. For example, if a female electrical socket carried on the turret is driven along the E axis, its contact recesses will frictionally engage prongs 38a–38c and springs 41a, 41b will snap into recesses on the female socket. If clamp shoes 17e, 17f are then retracted, leftward turret motion toward the head-stock then will withdraw plug 14e from its home position, paying out a length of cable 39 through aperture 23e. To disconnect plug 14e, the turret need merely be driven away from power assembly 50 with clamp shoes 17e, 17f extended, so that housing 31 is held in its home position against plate 50a. Housing 31 is preferably provided with a small shoulder as at 31a, so that clamp shoes 17e, 17f act as positive stops when extended rather than acting as brakes. Very little force is needed then to translate the clamp shoes, so that clamp devices EC1, Ec2, whether they be solenoids or cylinders, may be quite small and inexpensive. Engagement and disengagement of hydraulic connector 14h in a similar manner by movement of a mating turret-carried hydraulic device along axis H and selective operation of clamp shoes 17c, 17d will now be apparent without further explanation. It maybe noted that connection and disconnection of the electrical and hydraulic connectors differs from the disclosed mechanical shaft connection and disconnection, in that mechanical shaft 16a and mechanical holder 14m must rotate and will generally stop rotating at various random angles about axis M, depending precisely where motor EM1 stops, while the hydraulic and electrical connectors 14h and 14e need not and do not rotate, but do require precise angular alignment about axes H and E during an engagement operation because they carry plural fluid conduits or plural electrical prongs within a single body. However, it can be seen that the requirement that connectors 14h and 14e be properly oriented around the H and E axis require no special alignment or orientation means, since because the turret does not rotate and couplings 14h and 14e do not rotate while they are connected to the turret, the turret will always return the hydraulic and electrical devices 14h and 14e to their home positions at the same angles about the H and E axes which such devices had when they were previously withdrawn from their home positions, and clamp shoes 17c–17f need merely prevent devices 14h and 14e from rotating while they are seated in their home positions and not in use.

Figure 2B:
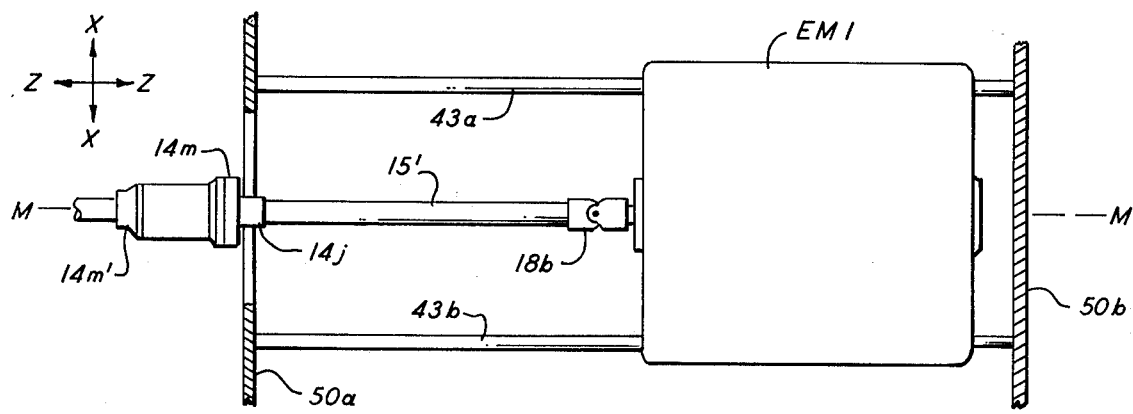
Figure 2C:
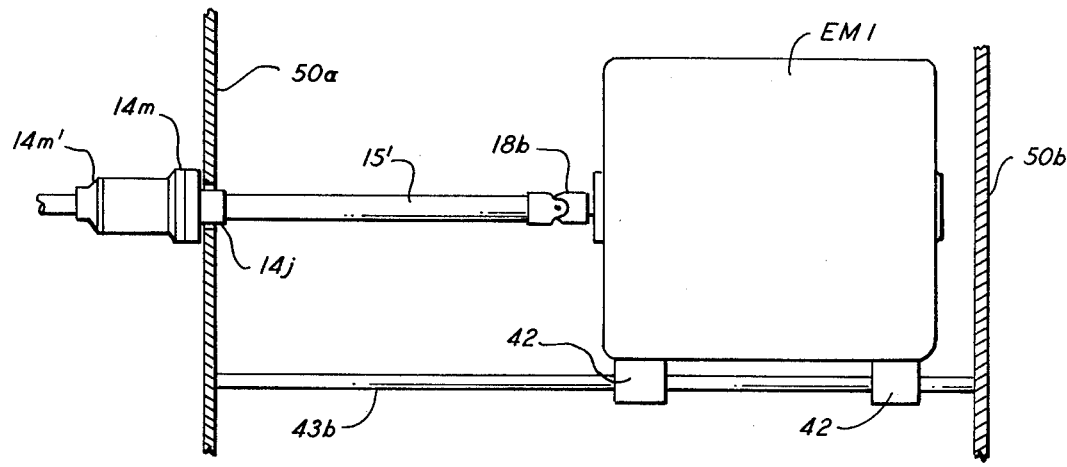

FIGS. 2b and 2c illustrate an arrangement for providing rotary mechanical power to holder 14m which may be used in lieu of the arrangement of FIG. 2a. Parts similar in principle to those of FIG. 2a are given similar reference characters. Adapter 14m′ carried in spindle 13 is shown engaged with holder 14m, and it will be understood that movement of the turret in the X and Z directions moves holder 14m in the same manner as in FIG. 2a. Rather than a U-joint coupling, the rear end of holder 14m carries a flexible shafting coupling 14j which connects preferably to both casing and core of a conventional piece of flexible shafting 15′. The other end of shafting 15′, preferably both casing and core, are connected to U-joint coupling 18b, one half of which is connected to the shaft of motor EM1. However, rather than being fixedly or pivotally mounted as in FIG. 2a, motor EM1 in FIGS. 2b and 2c is mounted on roller bearings (not shown) within four bearing pedestals 42, 42 to slide along slide rods 43a, 43a, which extend between are fixedly secured to front and rear mounting plates 50a, 50b of power assembly 50. As the turret moves in the Z direction, flexible shafting 15′ pulls or pushes motor EM1 along the slide rods, performing the function which was performed by the telescoping splined shaft assembly in FIG. 2a. X motion of the turret causes flexing of U-joing coupling 18b and flexing of shafting 15′, together with a small amount of sliding of motor EM1 along the slide rods. The arrangement of FIGS. 2b and 2c is deemed adequate for low torque applications, and that of FIG. 2a is preferred where greater torque transmission is required. Flexible shafting 15′ must have adequate stiffness to push motor EM1 without tending to buckle or kink, and shafting with such stiffness is readily available for many applications. The buckling forces applied to the shafting depend upon the inertia or weight of motor EM1 and the acceleration of the turret toward the Z home position. If shafting 15′ has limited buckling stiffness, the turret acceleration may be limited to prevent buckling, with some sacrifice in operating speed. While brake shoes 17a, 17b and actuators MC1, MC2 therefor are mounted on the front face of panel 50a for release of adapters from holder 14m, these devices are omitted from FIGS. 2a to 2c for sake of clarity.

In a third mechanical power-coupling arrangement illustrated in FIGS. 2d and 2e, coupling device 14m is connected by a piece of rigid shaft 16b, via U-joint coupling 18a, and the other end of shaft 16b is connected by U-joint coupling 18b to a shaft 16c, which is rotatably journalled in bearings atop bearing pedestals 43c, 43d carried on the power assembly 50 base shelf with motor EM1. However shaft 16c is also slidable lengthwise in the support bearings, and it carries pinion gear 22a securely affixed thereto. Pinion gear 22a is driven by a widened or splined gear 22b carried on shaft 22c which is journalled in bracket 43e shown affixed to motor EM1, and which carries gear 22d driven by gear 22e carried on the shaft of the motor. X motion of the holder 14m flexes couplings 18a, 18b in the same manner as in FIG. 2a, but Z motion of the holder reciprocates shaft 16c, causing pinion 22a to ride back and forth along gear 22b. Though shown extending only downwardly from shaft 16c, supports 43c, 43d may also extend upwardly to the top of assembly 50 and be fastened there for greater rigidity.

If desired, motor EM1 and bearing supports 43c, 43d may be mounted on a common plate 27c which is slightly pivotable about pin 16f, and U-joint coupling 18b may be eliminated, with shafts 16b, 16c comprising a single rigid shaft. The axis of pin 16f should intersect shaft 16c.

Figure 3:
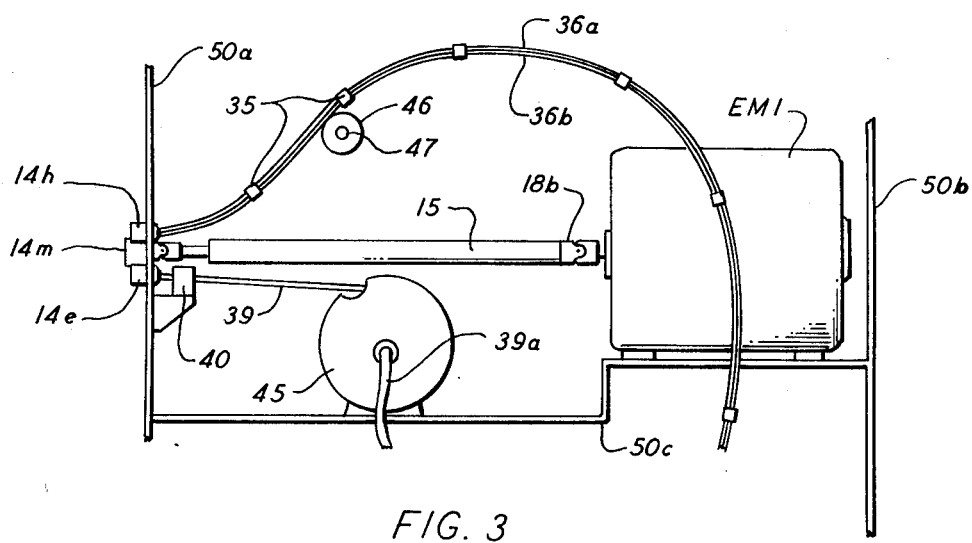

In FIG. 3 motor EM1, which is shown fixedly mounted in accordance with FIG. 2a is carried on a shelf 50c within assembly 50. The electrical cable 39 which extends rearwardly from connector device 14e is shown connected to a conventional spring-operated retractable cable reel 45, and thus as the turret moves connector 14e away from or toward its home position adjacent plate 50a, reel 45 pays out or reels in a length of cable 39. A length 39a of cable 39 extends from reel 45 to motor control apparatus (not shown) preferably mounted within assembly 50 below shelf 50c. The pair of hydraulic hoses 36a, 36b bound together at spaced intervals by bands 35 extends in an arc from connectr 14h to hydraulic control apparatus (not shown) preferably mounted below shelf 50c. The arc is made large enough that an adequate length of the double-hose may feed through aperture 23h to accommodate the maximum travel of the turret. The hydraulic hoses may be trained over a roller 46 journalled on a shaft 47 which extends horizontally between the sides of assembly 50. Some forms of high-pressure hydraulic hose have sufficient stiffness that they will support themselves in such an arc, while very flexible hose must be trained by means of rollers, pulleys or the like. It will be apparent that the electrical and hydraulic devices to which cable 39 and the hydraulic hoses are connected may be positioned at a variety of different positions within assembly 50, so that the cable and hoses may be trained in distinctly different directions than those shown in FIG. 3. In FIG. 3 a cable guide 40 is shown mounted on plate 50a just behind electrical connector 14e. In FIG. 3a cable guide 40 is shown as comprising an opening surrounded by four small rollers 40a. Guide 40 prevents cable 39 from rubbing on the edges of circular recess 23e. A similar guide (not shown) is preferably provided behind hydraulic plug 14h to prevent hoses 36a, 36b from scraping on the edges of recess 23h.

In FIGS. 4a and 4b tool-holder 11b mounted on a face of turret 10 in conventional fashion includes a bore B which lies on the M axis when that turret face is in working position and the turret is at its X mid-position. A shaft 51 fastened in bore B by set-screw 52 carries an arm EA extending radially from bore B to support electrical connector 14e′ on the E axis under such conditions. Connector 14e′ is shown as comprising a generally cylindrical shell 53. Three recesses 53a–53c are provided in a molded plastic body 54 within shell 53, each of the recesses containing a radially-expandible split copper sleeve which serves as a female electrical contact into which a respective prong of connector 14e (FIG. 2) may be plugged. A pair of annular ridges on shell 53 provide a groove 56 therebetween, into which the bent portions of springs 41a, 41b (FIG. 2) may snap when connectors 14e and 14e′ are engaged. Three wires extend from the socket contacts through a hole in arm EA and a bushing 58, and carry electrical contacts which may be connected to an electrical motor (not shown) carried on the same turret face as tool-holder 11c.

Figure 4C:
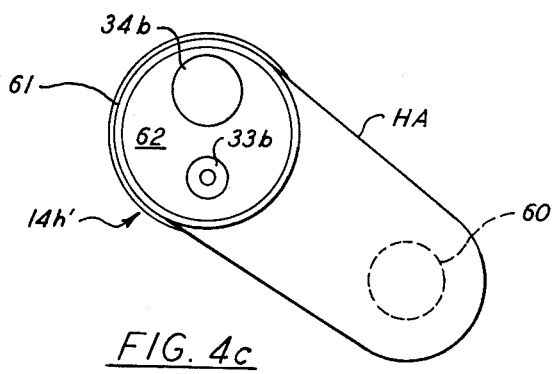
FIG. 4c is an end view of an assembly which may be used to mount a hydraulic coupling device on the turret.

In FIG. 4c hydraulic connector 14h' is shown mounted on arm HA, from which shaft 60 extends to be affixed in a tool-holder bore in the same manner as shaft 51 in FIG. 4a. Connector device 14h' comprises an outer metal shell 61 in which socket-type hydraulic coupling 34b and plug-type hydraulic coupling 33b are carried, mounted on a casting 62 similar to casting 32 in FIG. 2. Couplings 34b and 33b may be the same types as couplings 33a and 34a in FIG. 2. When connectors 14h and 14h' are connected together, plug 34a mates with socket 34b and plug 33b mates with socket 33a. Hydraulic lines (hoses or tubing, not shown) lead from the rear end of device 14h' to connect to hydraulic motive means (not shown) carried on the same turret face as connector 14h'.

Figure 8:
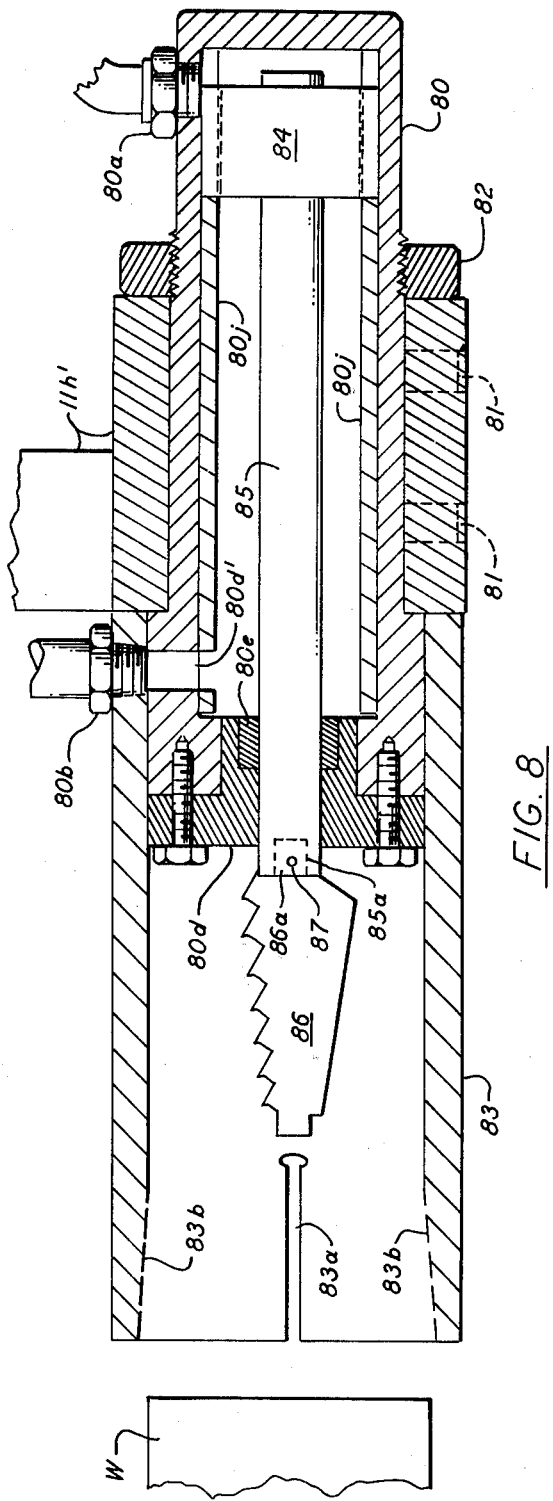
FIG. 8 is a cross-section view of an exemplary combination bar-puller and broaching tool constructed in accordance with the invention.

The utility of a number of prior art turret lathes has been decreased by a requirement that one turret face be used to carry a bar-puller rather than a machining tool. FIG. 8 illustrates a combination bar-puller and broaching tool assembly which allows a given turret face to have double utility. The bore of a conventional tool-holder 11h' carries a hydraulic cylinder 80 which is fixedly held in the bore by set screws 81, 81 and nut 82. Tool-holder 11h' is mounted on a turret face forwardly of another similar tool-holder 11h (not shown) which carries a hydraulic coupling 14h' in the manner previously described, and the pair of hydraulic lines leading from coupling 14h' connect to opposite ends of cylinder 80 and 80a and 80b. A generally-cylindrical sleeve 83 which functions as a bar-puller is rigidly affixed to cylinder 80 and tool holder 11h' by screws not visible in FIG. 8. Sleeve 83 includes one or more longitudinal slits such as that shown at 83a, and a tapering inner bore of the nature shown at 83b. The bar-puller works in conventional fashion. With the jaws of the bar-feed collet at the headstock gripping the workpiece stock W, the turret is driven in the Z direction to force the sleeve 83 on the end of the stock, with the end of the sleeve slightly radially expanding to frictionally grip the stock. The collet jaws are then released and the turret driven away from the headstock a desired distance to advance the workpiece stock a desired distance along the main spindle axis. The collet jaws are then closed to re-grip the workpiece, and then the turret is driven a further distance away from the headstock to remove the sleeve 83 from the end of the workpiece. Cylinder 80 is shown carrying an internal piston 84 on piston rod 85. Cylinder 80 is provided with a plurality of splines 80j, 80j which are engaged by grooves in piston 84, thereby preventing rotation of piston 84 and rod 85 as they are reciprocated. The forward end of rod 85 carries a non-cylindrical recess 85a which accommodates a rear post 86a of mating shape carried on a cutting tool 86, which is shown having the shape of a conventional broaching tool. Pin 87 extends through recess 85a and past 86a to retain the cutting tool on the end of rod 85. With piston 84 in the retracted position shown, sleeve 83 may operate as a bar-puller in conventional fashion. However, application of fluid pressure to extend cutter 86 allows the teeth of the cutter to extend beyond the left end of sleeve 83, and thus the assembly may be used to perform conventional broaching and shaping operations. The forward port 80d' in cylinder 80 may be spaced so that the forward face of piston 84 closes the port at the maximum desired extension of tool 86. It will be apparent that the piston may be operated either hydraulically or pneumatically.

The basic electronic portions of a known form of numerical control arrangement are shown in FIG. 6, together with several parts which may be added for use with the present invention. Tape reader 70 reads indicia encoded on a paper tape (not shown) to provide instruction signals to numerical control system CC. The numerical control system CC provides output signals to control the main spindle drive motor and thereby rotate workpiece W. System CC also provides output signals to an X axis servo drive and a Y axis servo drive to position turret 10 in the X and Z directions, and signals to a turret index drive means to index turret 10 about the T axis. A pulse generator PG geared to the main spindle provides output pulses representing small increments of rotation of the main spindle (such as 4096 pulses per revolution of the main spindle) for use by the control system CC in the control threading operation, where spindle speed must be accurately controlled in relation to Z axis drive speed. System CC also provides signals to various other devices, such as coolant valves which are not shown because they bear little or no relation to the present invention. As thus far described, everything shown in FIG. 6 is well known.

For operation with the present invention, a stepping motor SM is mechanically connected through a clutch CL to rotate the main spindle, the chuck CH and the workpiece W, preferably in an "open-loop" manner, i.e. the angle of the workpiece about the C axis need not be sensed to provide feedback signals to system CC. The greatest utility of the present invention may be obtained if the workpiece W angle about the C axis, which angle will be called Θ, can be accurately controlled. For example, flat surfaces then can be ground on opposite sides of the workpiece. While pulses from generator PG could be routed to a pulse counter so that the counter contents provided a continuous indication of workpiece angle about the C axis, it is extremely rare that a machining operation requires that a first flat or the like be provided on a particular side of the workpiece, and the workpiece is ordinarily initially clamped by chuck CH with the precise angle of the workpiece unknown, so that a continuous indication of the workpiece angle would tend to be meaning-less. However, it is frequently desired that flats or the like be ground or milled around a workpiece at locations which are say 90° or 180° or some predetermined angle from each other. In accordance with the invention, after a flat or the like has been provided on one side of the workpiece, stepper motor SM is operated with clutch CL engaged to rotate the workpiece through a desired angle, and then a second flat or the like may be machined. Clutch CL is provided to disconnect the stepper motor from the main spindle when the latter is being rotated by the spindle drive motor M1, to prevent motor M1 from rotating the stepper motor at high speed. The stepper motor is geared to rotate the main spindle at a much lower speed than the speeds at which motor M1 ordinarily drives the main spindle.

In accordance with the present invention, one or more instructions read from the punched tape may operate clutch CL to connect motor SM to the main spindle, and then a number of pulses specified by a tape-carried instruction may be applied to motor SM to rotate the workpiece through a desired angle. The tape-carried instruction may register a number in a counter, and an oscillator then may apply pulses to simultaneously step motor SM and decrement the counter, until a gate circuit senses a zero count condition in the counter to stop the oscillator or disconnect motor SM and release clutch CL. Use of an open-loop workpiece angle positioning system is not absolutely necessary, however, nor is use of a stepping motor. Pulses from generator PG could be used to decrement (or increment) a counter to provide equivalent operation, with a gating circuit responsive to the counter contents connected to stop either a stepping motor which provides continuous as opposed to step rotation. If a motor capable of continuous rotation is used, it should be arranged to rotate rather slowly and be arranged to be braked rapidly so that the workpiece does not coast appreciably past a desired angular position. The control system CC of the mentioned 1SC commercially-available machine has various unused code capacity which readily allows command signals necessary to control the equipment added in accordance with the present invention.

The known control system CC contains a pair of data registers, the contents of which indicate the X and Z positions of the drive table or turret. A signal indicating the X mid-position may be provided by a conventional gating circuit responsive to the contents of the X position register to verify that the turret is positioned correctly in the X direction prior to driving the turret to the Z home position to effect a coupling engagement or disengagement. Alternatively, the X drive mid-position may be sensed by a switch operated by linear motion of the X drive, or by a traveling nut on the X drive lead screw, or a variety of equivalent means. The X mid-position at which coupling and uncoupling is allowed to occur may in fact desirably embrace a small range of X positions, such as a range of say 0.006 inch extending 0.003 inch on either side of the actual mid-position. Two switches may be arranged to operate at slightly differing X positions, so that both switches will be closed (or both open) only when the X drive lies within the small range of X positions. It is desirable, of course, that the range be made quite small, to insure accurate alignment of the coupling devices and obviate the wear which can otherwise result. The Z drive position slightly out from the Z home position at which motor EM1 is started during a coupling operation, and the Z home position may be sensed in a similar manner, either by decoding the contents of the Z position register with a simple gating circuit or by using switches operated by operation of the Z drive motor, and the signals derived thereby may be used in a variety of different ways to actuate the brake and clamp shoes shown in FIG. 2. The shoe actuators, as previously mentioned, may comprise either electrical solenoids or air or hydraulic piston-cylinder assemblies, and no matter which they are, they may be either power-extended and spring retracted, or instead spring-extended and power retracted. Design of suitable electrical circuitry to operate electrical solenoids for shoe actuators or solenoids for valves which control hydraulic or pneumatic shoe actuators is simple and may take a variety of forms. The design is simplified by recognizing that the coupling and uncoupling operations inherently occur alternately. Thus a bi-stable relay or flip-flop which is toggled each time the turret is driven to the Z home position at the X mid-position will continuously indicate whether or not power is coupled to a turret-carried tool, and will provide a signal during the next translation to the home position appropriate for the required operation, whether it be a coupling or an uncoupling.

While the invention has been described thus far as involving the coupling of only one type of power or control to a tool carried on the turret face in working position, it will now become apparent from a consideration of FIGS. 7a and 7b, together with FIGS. 1e and 2, that two or more types of power or control may be simultaneously connected to or disconnected from the same turret face. While the previously-described Figures contemplated that only a single detachable connection device be carried on a given turret face, FIGS. 7a and 7b illustrate the use of three connectors on the turret face. Plate AA bolted to tool-holder 11 at 65, 65 is shown carrying hydraulic and electrical connector devices 14h' and 14e'. Spindle 13 rotatably journalled in the tool holder bore passes through a hole in plate AA and is provided with an adapter end 14m'. The three connection devices 14m', 14h' and 14e' are spaced relative to each other in the same manner as axes M, H and E are relatively spaced in FIGS. 1e and 2. In order to connect all three coupling devices simultaneously it is necessary that they all connect at the same Z position. Spindle 13 is held against endwise movement by bearings (not shown) in the tool-holder bore, and to allow simultaneous connection of all three connector devices, the hydraulic and electrical devices 14h and 14e are preferably made to be slightly adjustable in the Z direction relative to the spindle 13 and adapter 14m', connectors 14h and 14e being shown slidable in respective holes provided in plate AA and fixed therein by set screws 67, 67. It will be readily apparent at this point that any one or more of the connector devices can be eliminated from the assembly of FIGS. 7a and 7b, or that further connector devices may be carried on plate AA by slightly enlarging the plate. Such further connector devices could be centered, for example, on axes shown at P' and O' in FIG. 7a, so that they would be aligned with axes P and O (FIG. 1d) when the turret is at its X midposition. The mentioned commercially-available turret lathe thus far discussed includes a plurality of coolant tubes (not shown) which extend from the rear turret face (the face nearest the tailstock) to spray coolant fluid on respective turret-carried tools. In mounting connection devices 14m', 14e' and 14h' on the turret, it is generally necessary t6at such devices project from the turret toward assembly 50 beyond the coolant tubes, and that the coolant tubes be routed so as not to contact devices on plate 50a when the turret is in the Z home position.

Figure 4D:
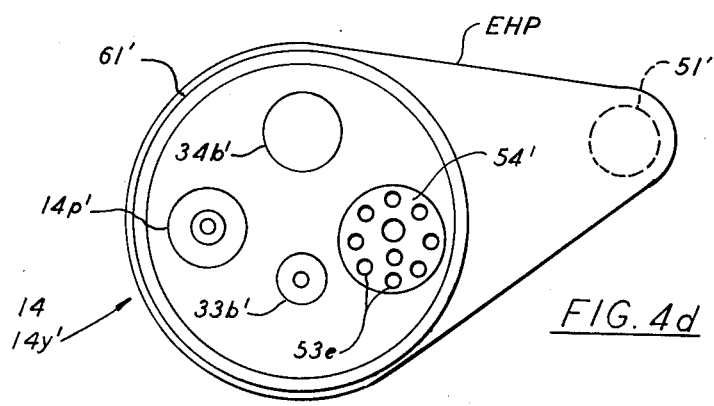
FIG. 4d is an end view of a hybrid turret-carried connector which is capable of supplying hydraulic, electrical and pneumatic connections, to apparatus carried on a turret.

While devices 14h and 14h' have been shown as carrying only hydraulic connection means and devices 14e and 14e' only electrical connection means, it will be apparent at this point that "hybrid" forms of connector devices may be readily designed to provide connection of two or more types of power and/or control signals, and that "supply" and "return" lines or conductors may be routed in different connector devices. FIG. 4d illustrates a hybrid coupling device 14y' carried on an arm EHP which extends from a shaft 51' which may be fixedly secured in a tool-holder bore in the manner of shaft 51 of FIG. 4a or shaft 60 of FIG. 4c. Device 14y' includes a shell 61' in which a hydraulic socket 34b' and a hydraulic plug 33b' are mounted, together with a quick-disconnect pneumatic coupling half 14p', and a plastic insulator 54' carrying a plurality of electrical contact recesses 53e. It will be apparent that mating devices may be mounted with the same relative spacing on a coupling device 14y (not shown) removably seated on plate 50a, with flexible hydraulic, pneumatic and electrical lines attached to the device 14y in the same manner as the hoses and cable previously described.

If a turret face carries a "Roto-change" adapter 14m' for mechanical power coupling, motor EM1 is started before the Z home position is reached during an engaging operation. If a turret face carries one or more hydraulic electrical or pneumatic couplings but no mechanical coupling, it is desirable (but not crucially necessary) that motor EM1 not be started when the turret is driven to the Z home position at the X mid-position. Starting of motor EM1 may be controlled by tape instructions. Alternatively, a plurality of switches may be manually set in accordance with the type of connectors provided on the different turret faces, to provide signals which control operation of motor EM1 and the shoe brake and clamp actuators.

FIG. 7c illustrates one form of simple control circuit which is useful in applications of the invention where plural power connectors are carried on one or more turret faces for simultaneous engagement. Switching means shown as comprising a rotary selector switch SS is provided with a number of stationary contacts corresponding to the number of faces on the turret, only five contacts being shown in FIG. 7c for sake of simplicity, and the arm of the selector switch is advanced as the turret is indexed, to apply positive voltage to the stationary contact associated with the turret face then in working position. Each stationary contact is shown connected to four contacts in column A of a plugboard, the number four assuming that four different types (e.g. mechanical, hydraulic, electrical and pneumatic) of connectors are used in the system. If turret face #1 carries no detachable power connector, no jumpers are inserted between the upper four plug contacts in row A and any of the horizontally adjacent plugboard contacts in row B. If turret face #1 carries only a mechanical coupling device, a jumper is placed between the uppermost contacts in rows A and B, as is shown at J1. If turret face #1 carries a pneumatic coupling device, a jumper is connected between the fourth contacts in rows A and B, and so forth. The contacts of row B of the plugboard are connected through respective diodes to one of four control lines m, h, e and p. Thus whenever the turret face in working position carries a particular type of power coupling, a control line is energized, and if the turret face carries two or more types of power coupling, two or more of lines m, h, e and p will be energized. If the starting of motor EM1 and operation of actuators MC1, MC2 are made to require a energization of line m, then those devices will not be operated if the turret face in working position carries no mechanical coupling device such as an adapter 14m'. The diodes prevent "sneak" circuits in a manner which will be evident to those skilled in the art.

Figure 9:
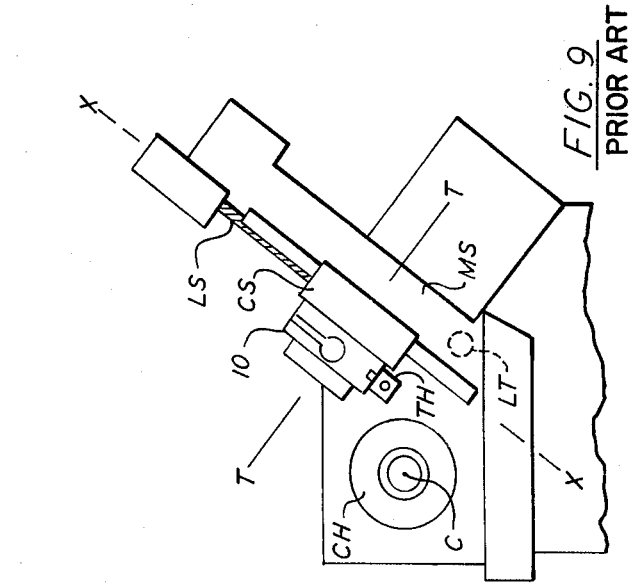
FIG. 9 is an end view diagram illustrating basic principles of a different known form of numerically-controlled turret lathe with which the present invention may be used.

While the invention thus far has been described in connection with a known form of turret lathe in which the turret index axis is parallel to the workpiece axis, the invention is readily applicable to various other forms of turret lathe, such as those wherein the turret indexing axis is perpendicular to the XZ plane in which the turret is translated. Inasmuch as no portion of the operation of the invention need depend upon gravity force, it will be apparent that the invention may be applied to various machines without consideration of which direction is vertical. FIG. 9 diagrammatically illustrates in end view one manner in which the invention may be applied to a "slant bed" turret lathe such as the "Star-Turn" 8-15 N/C Lathe sold by Pratt & Whitney Machine Tool Division of Colt Industries Operating Corporation, West Hartford, Connecticut. In FIG. 9 a chuck or bar-feed collet CH rotates a workpiece about axis C. A turret 10 is indexable about a slanting axis T, translatable in the slanting cross-feed direction indicated by axis X by means of lead screw LS, which translates cross-slide CS on which turret 10 is mounted, and turret 10 is translatable in the Z direction (parallel to axis C) by means of lead screw LT, which translates main slide MS on which cross-slide CS is mounted. In FIG. 9 turret 10 is assumed to have four faces, and a tool holder TH is shown carried on one face. It should be readily apparent that if one or more detachable coupling devices are provided on the tool holder and a power-coupling assembly 50 of the type previously described is provided, that translation of the turret to move the coupling device along a line having a predetermined X coordinate to a predetermined Z position away from the headstock may allow engagement and disengagement of mating power-coupling devices in substantially the same manner as that previously described.

Figure 10:
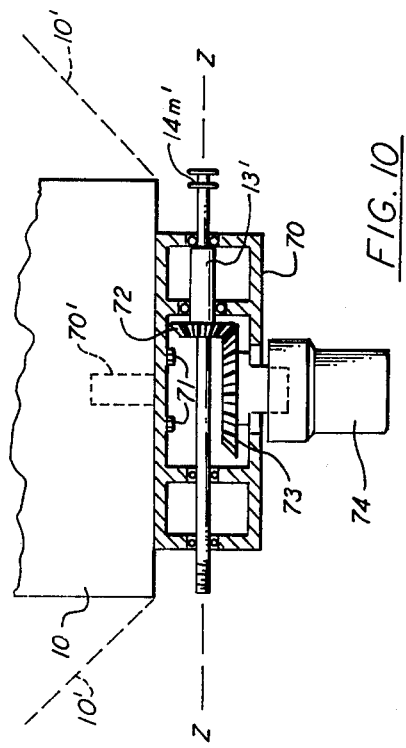
FIG. 10 is a view partly in cross-section, of one form of tool driving assembly which may be used on various turret lathes which are constructed or modified to use the present invention.

In FIG. 10 the turret 10 which may be of the type used on the lathe of FIG. 9 is shown carrying housing 70 which is mounted on the turret in the manner in which conventional center-mounted unpowered tools have been carried on such turrets, by a rear post 70' on housing 70 which extends into a bore in the turret, and by screws 71, 71. Shaft 13' journalled in and extending through housing 70 is shown provided with an adapter end 14m' of the "Roto-change" coupling type. Bevel gear 72 on shaft 13' drives bevel gear 73 journalled in the housing, thereby rotating a conventional rotary tool holder or chuck 74. A chuck or like device (not shown) can also or alternatively be mounted on the threaded left end of shaft 13'. It should be apparent that the rotational axis of bevel gear 73 could instead be arranged to extend from housing 70 at any one of a variety of different angles but still mesh with and be driven by gear 72 in the same manner. For example, the axis of gear 73 could extend either upwardly or downwardly from the position shown, i.e. perpendicularly to the plane of FIG. 10, or at any angle therebetween in the two quadrants bisected by the axis of gear 73 depicted in FIG. 10. As suggested by the dashed lines at 10' in FIG. 10, the turret thereshown need not be rectangular, but could instead be hexagonal, octagonal, or duodecagonal, for example. It will be readily apparent that the housing 70 of FIG. 10 could be readily modified, by elimination of post 70', and used on a face of turret 10 of the lathe shown in FIGS. 1a–1c.

Figure 11:
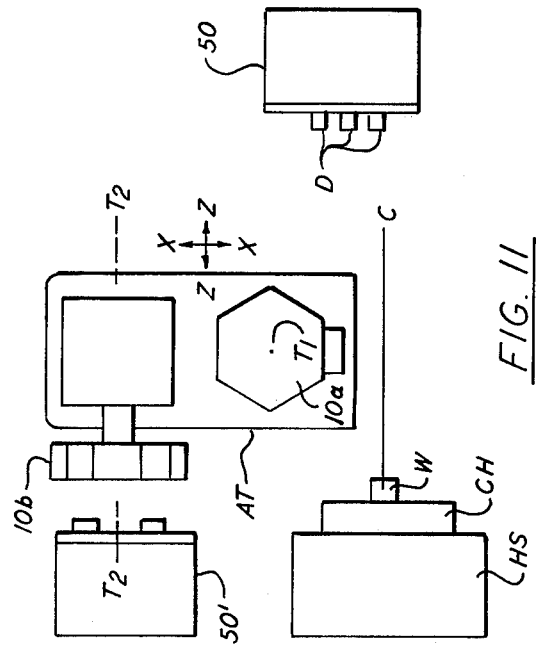
FIG. 11 is a plan view diagram of a further known form of turret lathe illustrating how the invention may be used to apply power to either one or two turrets provided on such a lathe.

Inasmuch as the orientation of the cross feed direction relative to the vertical is immaterial to the present invention, it will be readily apparent that the invention is readily applicable to turret lathes using a horizontal cross-feed, such as the LeBlond 12/12 NC turret lathe sold by LeBlond Incorporated of Cincinnati, Ohio, in order to apply power to tools carried on the horizontal front turret thereof. A plan view diagram of such a lathe is shown in FIG. 11, wherein headstock HS carrying chuck CH rotates workpiece W about axis C. A two-axis table AT is translatable in the X and Z directions shown by a conventional two-axis servo drive system (not shown). Table AT carries two turrets 10a and 10b. Front turret 10a is a horizontal turret indexable about a vertical axis $T_1$, while rear turret 10b is a vertical turret indexable about horizontal axis $T_2$. In accordance with the invention, one may provide power coupling assemblies for one or for both turrets, and in FIG. 11 two power-coupling assemblies are shown at 50 and 50'. Assembly 50 is shows as including a plurality of detachable power-coupling devices at D, any one or several of which may be coupled to one or more mating coupling devices carried on front turret 10a by appropriate indexing of turret 10a and X translation of table AT to locate the mating coupling device at a predetermined X coordinate, followed by rightward (in FIG. 11) Z translation of the table to a reference or limit position. Similarly, power-coupling assembly 50' may include one or more detachable power-coupling device to which mating coupling devices carried on turret 10b may be connected, by appropriate indexing of turret 10b and X translation of table AT, followed by leftward (in FIG. 11) Z translation of the table to a second reference or limit position.

Figure 13A:
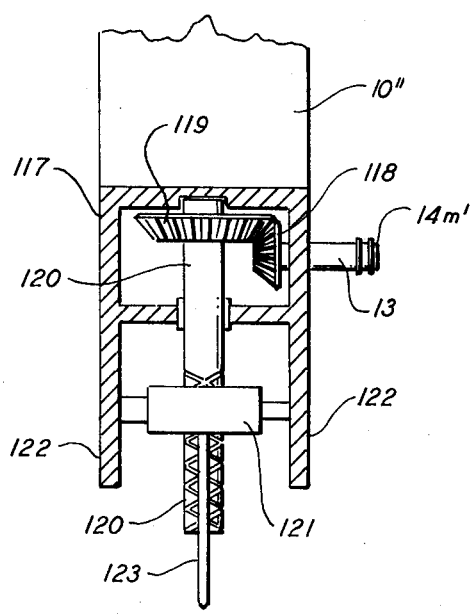
FIG. 13a is a plan view diagram, with parts in cross-section, illustrating an alternative manner in which tools may be driven in a turret in various embodiments of the invention.
Figure 13:
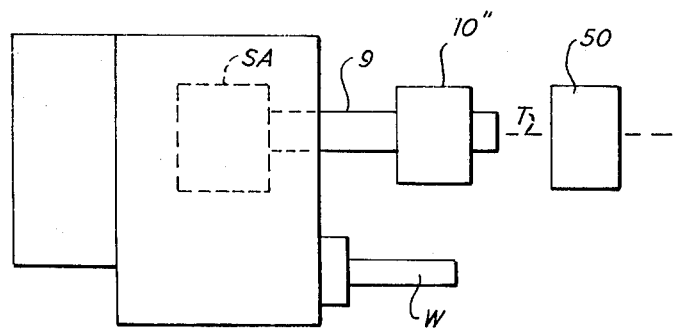
FIG. 13 is a plan view diagram illustrating the application of the invention to a different form of turret lathe.

While the invention has been illustrated in connection with several "two-axis" numerically-controlled lathes, it is important to note that the invention is applicable as well to single-axis lathes and three-axis lathes, and applicable to lathes which are controlled by mechanically-operated groups of switches, such as, for example, the single spindle chucking automatic lathes (Models 0AC, 1AC, 2AC, 3AC and 4AC) and single spindle bar automatic lathes (Models 0AB, 1AB and 21 AB) sold by The Warner and Swasey Company, Cleveland, Ohio 44103. FIG. 13 diagrammatically illustrates in plan view a lathe of such a type, wherein a workpiece W is rotated by a main spindle, and a turret 10" carried on turret shaft 9 is indexable about a fixed turret axis T and movable in the Z direction along with shaft 9. The forward (leftward in FIG. 13) portion of shaft 9 carries a plurality of switch actuators at SA, so that rotation and translation of shaft 9 operates a group of switches to automatically advance the lathe through a desired sequence of machining operations. It will be readily apparent at this point that a power-coupling assembly 50 generally of the nature heretofore described may be mounted aligned with the turret, so that translation of the turret will engage and disengage one or more detachable power-coupling devices carried on the turret with and from one or more detachable power-coupling devices removable seated on the powercoupling assembly, thereby greatly increasing the utility of such a lathe. Inasmuch as turret 10" does not travel in the X direction, it will be apparent that different types of power coupling may not be accomplished by translating the turret to different X positions, but it will be apparent that single or plural connections or power otherwise may be effected in the manner previously described. In applying the invention to such single-axis lathes, it becomes unnecessary that any of the flexible connection means flex in the X direction. Accordingly, it will be apparent that flexible couplings 18a, 18b then could be eliminated in FIG. 2a and 2d-2e, and that the motor need not pivot about 16a of 16f, a rigid shaft could be used in lieu of flexible shafting 15' in FIGS. 2b-2c and flexible coupling 18b could be eliminated, and that bearing 18f need not be pivotably mounted in FIG. 2f. Further, in accordance with another feature of the invention, a one-axis turret lathe of such a type may be converted into a two-axis lathe for some operations by use of means carried on the turret to provide cross-feed (X direction movement) of a turret-carried tool. In FIG. 13a housing 117 carried on turret 10" carried a spindle 13 with an adapter 14m' to rotate bevel gear 118, which meshes with bevel gear 119 to rotate shaft 120 extending in the X or cross-feed direction. Shaft 120 is shown carrying a traveling nut 121 which is prevented from rotating by slide-guides 122, 122, so that rotation of shaft 120 translates nut 121, thereby translating tool 123 affixed thereto. Shaft 120 may carry a double thread, so that rotation of spindle 13 in one direction alternately drives nut 121 and tool 123 in opposite directions. The one-axis lathe of FIG. 13 can, of course, carry tools rotatable about an axis parallel to the workpiece axis, the motive means carried on the turret can by hydraulic, pneumatic or electrical, and a reciprocating drive operating in the X direction may be provided for a tool carried in the turret of any of the previously-described lathes, of course, as well as with the one-axis lathe.

Figure 12B:
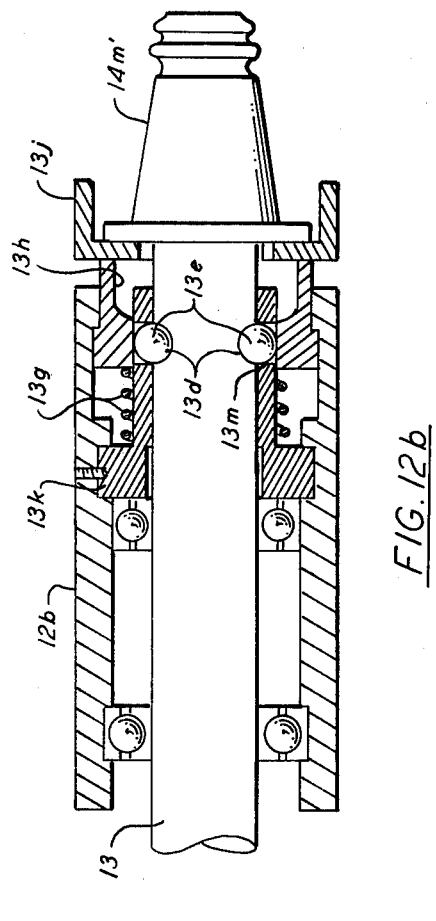
FIGS. 12a, 12b and 12c are plan views showing detachable connectors carried on the turret of the lathe with various forms of braking means.
Figure 12A:
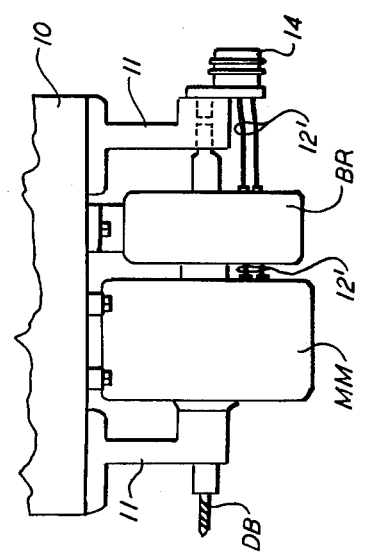

It is desirable that various tools carried on the turret by capable of use in either a powered or an unpowered mode. In the case of tools carried on the turret it is generally necessary of desirable that they be braked or otherwise fixed against movement when intended to be used in an unpowered mode, so that a drill, for example, will not be merely rotated by friction force from the workpiece when it is unpowered. For some applications, modes friction at a turret-carried spindle might prevent tool rotation by the workpieces if a substantial speed reduction is provided by gearing or the like interposed between the spindle and the tool, and the friction inherent in an electrical, hydraulic or pneumatic motor may hold an unpowered tool stationary if a substantial gear reduction is included with such a motive means. However, in most applications where it is desired to use a given tool alternatively in powered and unpowered modes, the use of an additional braking means will be deemed preferably. In the case of tools driven by electrical, hydraulic or pneumatic motors carried on the turret, it is desirable that such motors be provided with spring-set brakes which are released when the respective motors are energized. The use of a solenoid connected in parallel with an electric motor to release a brake carried on the shaft of the motor when the motor is energized is well known. In similar fashion, hydraulic or pneumatic pressure may be arranged to release a spring-set brake by operation of a hydraulic or pneumatic cylinder when hydraulic or pneumatic pressure is applied to an associated motor. In FIG. 12a a detachable coupling device 14 carried on the turret may be visualized as either a hydraulic, an electrical of a pneumatic detachable coupling device. Lines shown at 12' may be visualized as comprising hydraulic, pneumatic or electrical lines and they are shown connected both to a motive means MM, which may be visualized as comprising either a hydraulic, an electrical, or a pneumatic motor, and to a spring-set brake BR, containing brake shoes (not shown) which are urged by the force of an internal spring (not shown) against a disc or drum affixed to the shaft of motor MM. Brake BR contains an actuator which may comprise an electrical solenoid, or air or hydraulic piston-cylinder assembly operable to spread the brake shoes to release the brake. Where the actuator is hydraulic or pneumatic, only a single line (the supply line) need be connected to the brake. Motor MM is shown connected to drive a drill bit DB. Brakes such as BR may be omitted, of course, from motors carried on the turret intended to power tools not also intended to be used in an unpowered mode. Where a turret-carried tool is driven mechanically, but also desired to be operated at various times in an unpowered mode, it is desirable that a mechanical braking means which is mechanically triggerable between locked and unlocked conditions also be carried on the turret. For many applications a simple arrangement of the nature shown in FIG. 12b is entirely satisfactory. Spindle 13 provided with an adapter end 14m' is rotatably journalled in housing 12b which is affixed in the bore of a tool-holder 11 (not shown in FIG. 12b) carried on the turret. A air of arcuate grooves 13d are milled across opposite faces of spindle 13. If balls 13e, 13e are seated within the two grooves, spindle 13 may not rotate in either direction relative to housing 12b. In FIG. 12b movable sleeve 13h is shown translated to its rightward limit position by spring 13g, so that sleeve 13h entraps the balls within the grooves. Spring 13g acts against sleeve 13k fixedly pinned within housing 12b. Sleeve 13k is provided with ports or slots 13m, into which the balls can move radially if sleeve 13h is moved leftwardly to align the ports with the balls. The right end of sleeve 13h is shown engaging a ring 13h having a diameter corresponding to that of a holder portion (not shown) of a "Roto-change" coupling assembly. When the turret is moved to engage adapter 14m' with a holder 13m, the end of the holder presses against ring 13j to move sleeve 13h leftwardly in FIG. 12b against the force of spring 13g, thereby allowing the balls to move radially and free spindle 13 so that it may be rotated by the holder. If the holder is disconnected from the adapter 14m', the spring moves sleeve 13h rightwardly, forcing the balls into the grooves to lock spindle 13 against rotation.

Figure 12C:
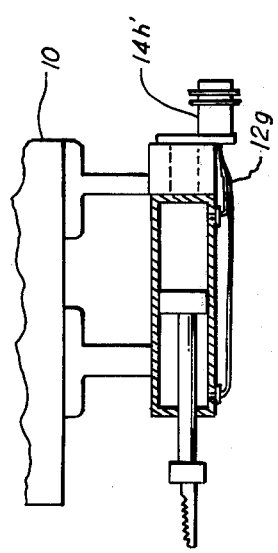

In FIG. 12c a hydraulic (or pneumatic) piston-cylinder assembly shown carried on the turret is reciprocated by alternate pressurization and de-pressurization of hydraulic (or pneumatic) lines 12g which extend from hydraulic coupling device 14h'. If the hydraulic coupling is the two-way shut-off type previously mentioned, piston motion will be very effectively blocked when coupling 14h' is not engaged, since the devices 33b, 34b (FIG. 4c) act as check valves leaving the cylinder full of hydraulic fluid. If the cylinder is a pneumatic one and two-way shut off pneumatic coupling devices are used, piston motion will be opposed, but less effectively than with a hydraulic arrangement, due to the compressibility of air.

While mechanical coupling has been shown effected by the holder and adapter portions of a "Roto-change" detachable coupling assembly, it is important to note that various other forms of detachable mechanical couplings may be used. A slightly modified version of the "Geni" assembly sold by the mentioned Universal Engineering Division in one example, and is illustrated in FIG. 14 together with actuating means for connecting and releasing such an assembly. Spindle 13 which is journalled on the turret (not shown in FIG. 14) is provided with a non-circular end 13f' which seats in and is locked in a cooperating recess in adapter 14m' by means of set screw 14s'. Adapter 14m' includes a pair of annular conical surfaces 14p and 14r, and a pair of nonannular slots 14s and 14t. The body or holder 14m comprises a generally cylindrical housing 125 have a pair of radially-extending passages 125a, 125b in which a pair of balls 126, 126 are carried, the inner ends of the passages having a diameter less than that of the balls may not fall into bore 125c within the housing. Sleeve 127 surrounds housing 125 and is axially movable between limits established by stops shown as comprising rubber O-rings 128a, 128b carried in grooves on the outer periphery of the housing, and sleeve 127 is provided with an end portion 127a having a radius exceeding that of the housing. Spring 129 acting between sleeve 127 and flange 125d of the housing normally urges sleeve 127 leftwardly against stop 128a, so that sleeve 127 forces balls 126 to extend radially into bore 125c. If sleeve 127 is moved rightwardly (in FIG. 14) to situate end portion 127a of the sleeve over passages 125a, 125b, it will be apparent that balls 126 may move slightly radially outwardly so as not to project into bore 125c. If adapter 14m' is inserted into bore 125c, conical surfaces 14p, 14r seat on mating surfaces within the bore, and then if balls 126 are held seated in grooves 14s, 14t by sleeve 127, the adapter is gripped by the holder so that rotation of the holder rotates the adapter. The rear end of holder 14m is shown formed to provide one half of a Hookes U-joint coupling 18a, the other half of which is connected to splined shaft 16a, as shown in FIG. 2a, for example.

In FIG. 14 a means for axially translating sleeve 127 is shown as comprising a linear actuator MC3 which is pivotally mounted at its rear end, as shown at 130, to structure (not shown) fixed relative to mounting plate 50a. Rod 131 of the actuator passes through a slot in plate 50a, and is provided with a right angle bend at its outer end which passes through cam slots 132a in a pair of identical brackets 133, 133 affixed to plate 50a, only one such bracket being visible in FIG. 14. A single such bracket may be used if it is thick enough. A tab 134 extends upwardly from the end of rod 131 as shown. Actuator MC3 is shown in approximately its mid-position. If the actuator rod is extended, it will be seen that the end of rod 131 will ride downwardly in cam slot 132a, lowering tab 134 below the level of flange 126a on sleeve 127. Conversely, if rod 131 is retracted from the position shown, tab 134 will move rightwardly, moving sleeve 127 and compressing spring 129. A small ball 135 is shown provided in tab 134 so that rotation of the holder will not wear the tab or flange 134. To engage the coupling assembly of FIG. 14, actuator MC3 moves sleeve 127 rightwardly, and then turret motion in the Z direction allows adapter 14m' to enter bore 125c. Actuator MC3 is then moved to its opposite limit position, releasing sleeve 127 so that it is pushed leftwardly by spring 129, and sleeve 127 urges balls 126 radially inwardly. The motor which drives shaft 16a is started at that time (or it may be started prior to that time), and as the holder rotates to align grooves 14s, 14t with the balls, the balls snap into the grooves, so that the holder drives the adapter and spindle 13, and Z turret motion may withdraw holder 14m from its seated position against plate 50a. To disengage the assembly of FIG. 14, the turret is driven to position holder 14m (which is then rotating) approximately in the position shown, actuator MC3 is then operated to move sleeve 127 rightwardly, and the turret is then driven leftwardly to remove adapter 14m' from the bore of the holder, and then the motor driving shaft 16a is stopped. Actuator MC3 may be left in its retracted position in preparation for a subsequent engagement, or it may be extended to relax spring 129 while the holder 14m is not in use. A further pair of actuators (not shown in FIG. 14) are provided to clamp the rear end of holder 14m in a predetermined position on the M axis while it is not in use, the clamp shoes operated by these further actuators being shown at 17g, 17h.

FIG. 14a illustrates the principles of a further mechanical coupling assembly similar to that of FIG. 14 but wherein the release sleeve acts as an angularly movable rather than an axially movable cam. The balls 126 are shown seated within the recesses or slots 14s, 14t of the adapter 14m'. The release sleeve 127' is not axially movable relative to body 125', but is slightly rotatable with respect thereto, against the force of springs 129' which act against arms 125e extending into arcuate recesses 127f in sleeve 127'. The release sleeve is provided with a pair of cam surfaces 127g. With the springs biasing sleeve 127' to the centered position shown, the balls will be seen to remain seated within the slots of the adapter to provide positive drive. However, with the assembly rotating, if a braking torque is applied to sleeve 127', the slight rotation of the sleeve relative to the body will allow the balls to move radially outwardly, and centrifugal force will move them outwardly, thereby releasing the adapter. Suitable means for braking the release sleeve were shown above in connection with FIGS. 1e and 2.

Figure 5C:
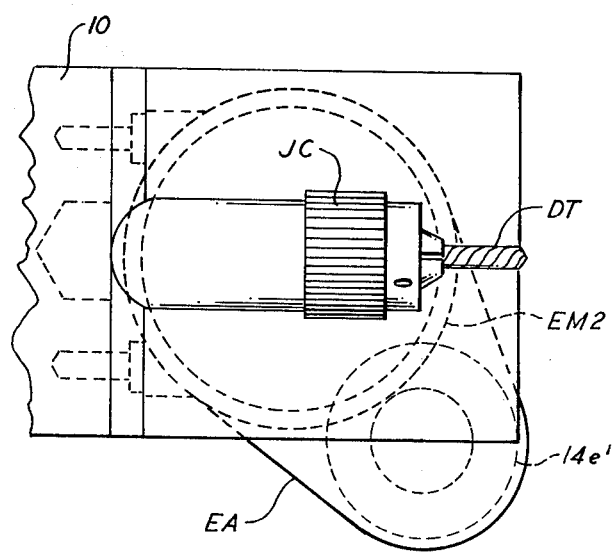

In various applications of the invention it is desirable that the end of a powered turret-carried tool extend a minimum distance from the turret face on which it is mounted, and one arrangement for accomplishing that advantage is illustrated in FIGS. 5a–5c. Rather than being mounted in or on a tool-holder 11, electric motor EM2 is shown mounted directly on a face of turret 10, with bosses 101, 101 affixed to the motor seated in bores on the turret face. Motor EM2 carries arm EA carrying electric coupling 14e'. In order that the end of drill tool DT not extend a large distance from the turret face, a shaft 102 carrying spur gear 103 is mounted closely adjacent the turret face, so that rotary power is transmitted rearwardly (i.e. toward the turret face) from gear 104 carried on the motor shaft and meshing with gear 103. Shaft 102 is journalled in a tubular portion of housing 105 in bearings 106, 106, and bevel gear is carried on one end. Shaft 108 journalled in an outwardly-extending end portion of housing 105 by bearing 109 carries bevel gear 110 which meshes with bevel gear 107, and carries Jacobs chuck JC which in turn is shown carrying drill bit DT. Housing 105 is also provided with circular bosses which seat in circular bores in the turret face, and straps 111, 111 are bolted into the turret face to maintain the assembly in place.

Figure 5D:
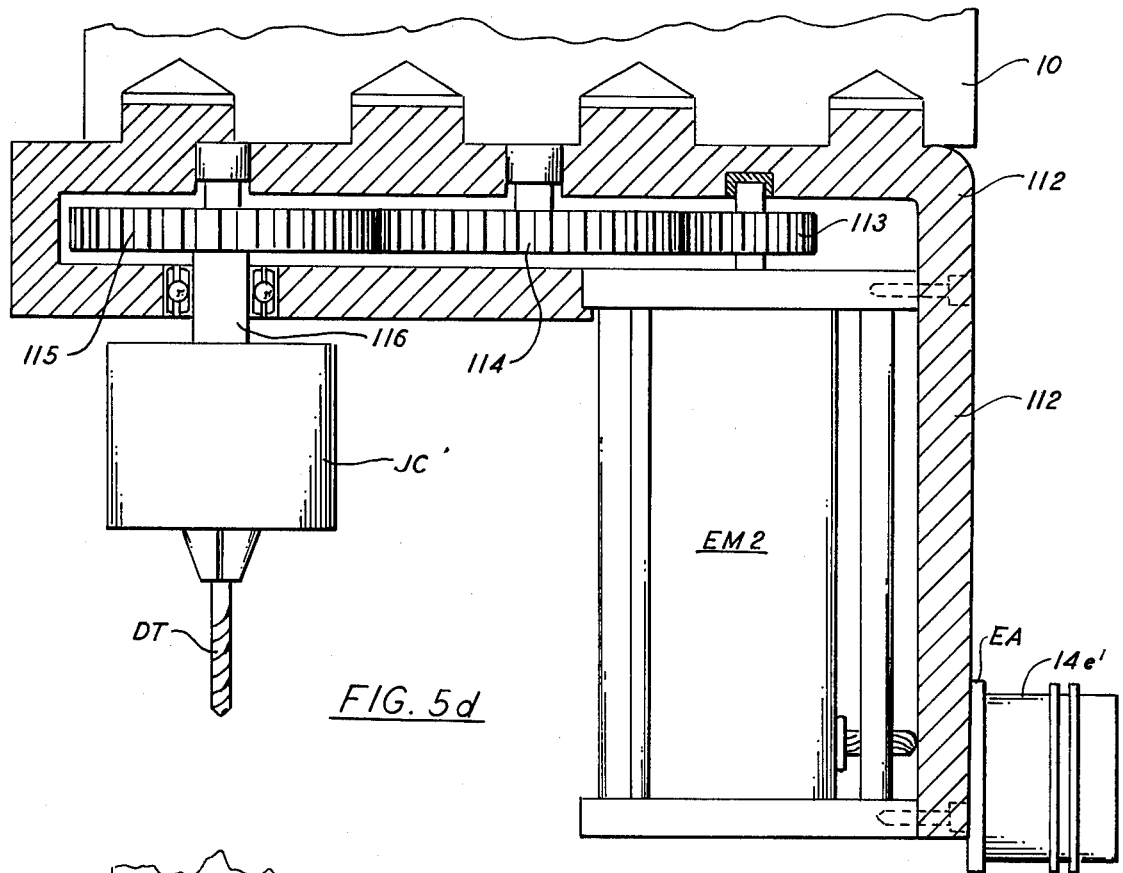
FIG. 5d is a plan view illustrating an alternative arrangement for carrying a powered tool on a turret in accordance with the invention.

FIG. 5d illustrates in plan view an alternate arrangement wherein electric motor EM2 is mounted on the turret face by bracket 112 so that the motor shaft extends in the X direction (when its associated turret face is in working position). The motor torque is transmitted leftwardly by a plurality of pinion gears 113, 114, 115, each shown journalled in bracket 112. The leftwardmost gear 115 is carried on a shaft 116 which also carries chuck JC. Intermediate gear 114 functions as an idler gear. It will be apparent that the Z position of the chuck and tool DT axis may be varied in different applications by the use of one or more additional idler gears, and by variation in the diameters of the gears. The gear housing shown formed by bracket 112 may include top and bottom covers (not shown) and be filled with grease or other lubricant, if desired. Though not visible in FIG. 5d, bracket 112 is fastened to turret 10 by bolts which screw into the turret face.

The control or pilot signals heretofore referred to may include signals commensurate with position, velocity or force of turret-carried motive means, and they may be used in conventional fashion by control apparatus (not shown) within assembly 50 or by computer CC to provide closed-loop control of devices carried on the turret.

It will thus be seen that the objects set forth above, among those made apparent from the preceding description, are efficiently attained, and since certain changes may be made in the above constructions without departing from the scope of the invention, it is intended that all matter contained in the above description or shown in the accompanying drawings shall be interpreted as illustrative and not in a limiting sense.

The embodiments of the invention in which an exclusive property or privilege is claimed are defined as follows:

1. In a turret lathe having a machine base, headstock means carried on said base for rotating a workpiece about a first axis, a turret rotatably indexable about a second axis to a plurality of discrete index positions to selectively present successive tools carried on said turret to said workpiece, means for indexing said turret about said second axis, and means for translating said turret relative to said base in a first coordinate direction parallel to said first axis, the combination of: a first detachable power-coupling device carried on said turret and connected to power a first tool carried on said turret, and a power-coupling assembly mounted on said base, said assembly including a second detachable power-coupling device, means for detachably supporting said second detachable power-coupling device in a first predetermined location relative to said maching base, and flexible means for connecting power to said second detachable power-coupling device during movement of said second detachable power-coupling device in said first coordinate direction away from said first predetermined location, said first and second detachable power-coupling devices being adapted to be connected to and disconnected from each other by translation of said turret with said turret in a first one of said index positions to move said first detachable power-coupling device along a first predetermined line to a reference position having a predetermined coordinate in said first direction.

2. The combination according to claim 1 wherein said means for translating said turret is also operable to translate said turret relative to said base in a second coordinate direction perpendicular to said first coordinate direction, said flexible means is operative to connect power to said second detachable power-coupling device during movement of said second detachable power-coupling device in said second coordinate direction, and wherein said first predetermined line has a predetermined coordinate in said second direction.

3. The combination according to claim 2 wherein said flexible means for connecting power to said detachable power-coupling device comprises rotary motive means pivotally mounted on said machine base to pivot about an axis perpendicular to said first and second coordinate directions, said motive means having a rotary output shaft, a longitudinally-extensible splined shaft means having one of its ends connected to said rotary output shaft, and a flexible coupling connecting the other end of said splined shaft means to said second detachable power-coupling device.

4. The combination of claim 2 having a second turret rotatably indexable to a plurality of index positions to selectively present successive tools carried on said second turret to said workpiece and translatable relative to said base in said first and second coordinate directions, a third detachable power-coupling device carried on said second turret and connected to power a tool carried on said second turret, and a second power-coupling assembly mounted on said base, said second assembly including means for detachably supporting a fourth detachable power-coupling device in a second predetermined location relative to said machine base and second flexible means for connecting power to said fourth detachable power-coupling device upon movement of said fourth detachable power-coupling device in said first and second coordinate directions away from said second predetermined locations, said third and fourth detachable power-coupling devices being adapted to be connected to said disconnected from each other by translation of said second turret with said second turret in a predetermined one of its index positions to move said third detachable power-coupling device along a second predetermined line having a predetermined coordinate in said second direction to a second reference position having a predetermined coordinate in said first direction.

5. The combination according to claim 2 wherein said flexible means for connecting power to said second detachable power-coupling device comprises rotary motive means affixed to said base and having an output shaft, bearing means mounted to pivot relative to said base an axis perpendicular to said first and second directions, a longitudinally-extensible splined shaft means having a first of its ends rotatably journalled in said bearing means, a flexible coupling connecting the other end of said splined shaft means to said second detachable power-coupling device and pulley-belt means interconnecting said first end of said shaft means and said output shaft of said motive means.

6. The combination according to claim 2 wherein said flexible means for connecting power to said second detachable power-coupling device comprises rotary motive means, first gear means connected to be driven by said motive means, a longitudinally-movable first shaft means, bearing means fixed relative to said motive means for rotatably and longitudinally slidably supporting said first shaft means, second gear means affixed to said shaft means and engaging said first gear means, and a second longitudinally-movable shaft means and a flexible coupling means connecting said first shaft means to said second detachable power-coupling device.

7. The combination according to claim 1 wherein said means for detachably supporting said second detachable power-coupling device comprises clamp means, and an actuator situated at a predetermined position relative to said machine base, said actuator being selectively operable to move said clamp means into and out of engagement with said second detachable power-coupling device.

8. The combination according to claim 7 wherein said means for detachably supporting said second detachable power-coupling device comprises a plate having an aperture, said aperture being situated at a predetermined position relative to said aperture, and wherein a length of said flexible means is movable through said aperture.

9. The combination according to claim 1 wherein said flexible means for connecting power to said second detachable power-coupling device comprises rotary motive means fixedly mounted on said machine base, said motive means having a rotary output shaft, first and second flexible couplings, a longitudinally-extensible splined shaft means, said first flexible coupling interconnecting said second detachable power-coupling device and one of said splined shaft means, said second flexible coupling interconnecting said rotary output shaft and the other end of said splined shaft means.

10. The combination according to claim 9 wherein said longitudinally-extensible splined shaft means comprises a first shaft of non-circular cross-section telescopingly-engaging a hollow recess of non-circular cross-section in a second shaft of said shaft means.

11. The combination accordingly to claim 1 wherein said first detachable power-coupling device includes rotary shaft means mechanically connected to drive said first tool.

12. The combination according to claim 1 having electrical motive means carried on said turret and mechanically connected to drive said first tool, and wherein said first and second detachable power-coupling devices comprise a pair of mating electrical connectors and said flexible means comprises flexible electrical cable, said first detachable power-coupling device being electrically connected to said electrical motive means.

13. The combination according to claim 12 having spring-operated retractable reel means adapted to pay out and reel in portions of said cable during said movement of said second detachable power-coupling device.

14. The combination according to claim 1 having hydraulic motive means carried on said turret and mechanically connected to drive said first tool, and wherein said first and second detachable power-coupling devices comprise a pair of mating hydraulic connectors and said flexible means comprises flexible hydraulic hose means, said first detachable power-coupling device being hydraulically connected to said hydraulic motive means.

15. The combination according to claim 1 having a third detachable power-coupling device fixedly mounted on said turret and connected to power a second tool carried on said turret, said first and second tools being carried at different index positions of said turret, said third detachable power-coupling device being adapted to be connected to and disconnected from said second detachable power-coupling device upon indexing of said turret to a second one of its index positions and translation of said turret to move said third detachable power-coupling device along said first predetermined line to said reference position.

16. The combination according to claim 1 having a third detachable power-coupling device mounted on said turret and connected to power a second tool carried on said turret, said first and second tools being carried at different index positions of said turret, said power-coupling assembly including means for detachably supporting a fourth detachable power-coupling device in a second predetermined location relative to said machine base and second flexible means for connecting power to said fourth detachable power-coupling device during movement of said fourth detachable power-coupling device in said first coordinate direction away from said second predetermined location, said third and fourth detachable power-coupling devices being adapted to be connected to and disconnected from each other by translation of said turret with said turret in a second one of said index positions to move said third detachable power-coupling device along a second predetermined line to a position having a predetermined coordinate in said first direction.

17. The combination according to claim 1 wherein said predetermined coordinate in said first direction corresponds to maximum translation of said turret away from said headstock means in said first coordinate direction.

18. The combination according to claim 1 wherein said lathe includes support means adapted to support a tailstock, said power-coupling assembly being fixedly mounted on said support means.

19. The combination according to claim 1 having means for angularly positioning said workpiece about said first axis to a selected angular position.

20. The combination according to claim 19 wherein said means for angularly positioning said workpiece comprises a stepping motor connected to said headstock means through a clutch, and means for engaging said clutch and applying selected numbers of actuating pulses to said stepping motor.

21. The combination according to claim 1 having means carried on said turret for rotatably journalling said first detachable power-coupling device for rotation about an axis parallel to said first axis.

22. The combination according to claim 21 having a tool spindle journalled on said turret for rotation about an axis perpendicular to said first axis and including means for driving said first tool, and gear means carried on said turret for connecting rotary mechanical torque from said first detachable power-coupling means to said tool spindle.

23. The combination according to claim 1 having means responsive to translation of said second detachable power-coupling device to said first predetermined location for temporarily blocking removal of said second detachable power-coupling device from said first predetermined location, whereby translation of said turret and said first detachable power-coupling device in said first coordinate direction toward said headstock means serves to disconnect said first detachable power-coupling device from said second detachable power-coupling device.

24. The combination according to claim 1 wherein said second detachable power-coupling device includes a body portion and a release sleeve means operable upon movement relative to said body portion to release said second detachable power-coupling device, and wherein said power-coupling assembly includes controllable releasing means operable to engage said release sleeve means upon movement of said second detachable power-coupling means to said first predetermined location.

25. The combination according to claim 1 wherein said second axis is parallel to said first axis.

26. The combination according to claim 1 having automatic program control means for controlling said means for indexing said turret and said means for translating said turret in said first and second coordinate directions.

27. The combination according to claim 1 wherein said first tool comprises a hollow sleeve having a radially expansible end adapted to surround and frictionally engage the end of a bar of workpiece stock and a cutter tool reciprocable within said sleeve to extend beyond said end of said sleeve, reciprocating motive means carried on said turret to reciprocate said cutter tool, and means for connecting power from said first detachable power-coupling means to said reciprocating motive means.

28. The combination according to claim 1 having a third detachable power-coupling device fixedly mounted on said turret and connected to power a second tool carried on said turret, said power-coupling assembly including means for detachably supporting a fourth detachable power-coupling device in a second predetermined location relative to said machine base and second flexible means for connecting power to said fourth detachable power-coupling device during movement of said fourth detachable power-coupling device in said first coordinate direction away from said second predetermined location, said first and third detachable power-coupling devices being mounted on said turret with a relative spacing corresponding to the relative spacing between said first and second predetermined locations, whereby both said first and third detachable power-coupling devices may be simultaneously connected to or disconnected from said second and fourth detachable power-coupling devices, respectively.

29. The combination according to claim 1 including braking means carried on said turret and operable to brake motion of said first tool in the absence of a connection of power to said first tool.

30. The combination according to claim 29 having electrical motive means carried on said turret and mechanically connected to power said first tool, said first detachable power-coupling device comprises electrical conductor means connected to supply electrical current to said motive means, and wherein said braking means comprises a spring-set electrically released brake mechanically connected to brake movement of said first tool and electrically connected to said connector means to be energized simultaneously with said electrical motive means.

31. The combination according to claim 29 having a hydraulic motive means carried on said turret and mechanically connected to power said first tool, said first detachable power-coupling device comprises hydraulic connector means connected to supply hydraulic current to said motive means, and wherein said braking means comprises a spring-set hydraulically released brake mechanically connected to brake movement of said first tool and hydraulically connected to said connector means to be energized simultaneously with said hydraulic motive means.

32. The combination according to claim 29 having pneumatic motive means carried on said turret and mechanically connected to power said first tool, said first detachable power-coupling device comprises pneumatic connector means to supply pneumatic current to said motive means, and wherein said braking means comprises a spring-set pneumatically released brake mechanically connected to brake movement of said first tool and pneumatically connected to said connector means to be energized simultaneously with said pneumatic motive means.

33. The combination according to claim 29 wherein said braking means comrises a mechanical brake operable to prevent rotation of said first detachable power-coupling device in the absence of connection of said second detachable power-coupling device to said first detachable power-coupling device.

34. The combination according to claim 1 wherein said flexible means for connecting power to said second detachable power-coupling device comprises rotary motive means slidingly mounted on said machine base to slide in said first coordinate direction, said motive means having a rotary output shaft, a piece of flexible shafting having one end connected to said second detachable power-coupling device, and flexible mechanical coupling connecting said output shaft of said motive means to the other end of said piece of flexible shafting.

35. The combination according to claim 1 wherein said first detachable power-coupling device comprises a shaft having a recess, and said second detachable power-coupling device comprises a member having a bore adapted to receive said shaft of said first device, a passage extending radially from said bore, a ball situated within said passage, and release means carried on said member for forcing said ball radially inwardly to seat in said recess of said shaft to retain said shaft within said bore and mechanically interconnect said first and second detachable power-coupling devices.

36. The combination according to claim 35 wherein said release means comprises a spring-biased sleeve surrounding said member.

37. The combination according to claim 1 wherein said first and second detachable power-coupling devices comprise a pair of mating hydraulic connectors.

38. The combination according to claim 1 wherein said first and second detachable power-coupling devices comprise a pair of mating pneumatic connectors.

39. The combination according to claim 1 wherein said first and second detachable power-coupling devices comprise a pair of mating electrical connectors.

40. The combination according to claim 5 wherein said motive means and said bearing means are mounted to pivot about an axis perpendicular to said first and second directions.

* * * * *